US008984169B2

(12) United States Patent
Mera et al.

(10) Patent No.: US 8,984,169 B2
(45) Date of Patent: Mar. 17, 2015

(54) DATA COLLECTING DEVICE, COMPUTER READABLE MEDIUM, AND DATA COLLECTING SYSTEM

(75) Inventors: Keisuke Mera, Kawasaki (JP); Shigeo Matsuzawa, Tokyo (JP); Tomonori Maegawa, Tokyo (JP); Yu Kaneko, Yokohama (JP); Toshio Ito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/312,038

(22) Filed: Dec. 6, 2011

(65) Prior Publication Data

US 2012/0185560 A1 Jul. 19, 2012

(30) Foreign Application Priority Data

Jan. 13, 2011 (JP) ................................. 2011-005091

(51) Int. Cl.
*G06F 15/16* (2006.01)
*H04L 29/08* (2006.01)
*H04L 12/26* (2006.01)

(52) U.S. Cl.
CPC .............. *H04L 67/325* (2013.01); *H04L 43/08* (2013.01); *H04L 43/022* (2013.01); *H04L 43/0864* (2013.01)
USPC ....................................................... 709/248

(58) Field of Classification Search
USPC ....................................................... 709/248
See application file for complete search history.

(56) References Cited

U.S. PATENT DOCUMENTS

| 5,526,357 | A | * | 6/1996 | Jandrell ....................... 370/346 |
| 5,828,835 | A |   | 10/1998 | Isfeld et al. |
| 5,916,306 | A |   | 6/1999 | Ruiz |
| 5,926,458 | A |   | 7/1999 | Yin |
| 6,058,420 | A |   | 5/2000 | Davies |
| 6,067,107 | A |   | 5/2000 | Travaille et al. |
| 6,091,740 | A |   | 7/2000 | Karasawa |
| 6,154,681 | A |   | 11/2000 | Drees et al. |

(Continued)

FOREIGN PATENT DOCUMENTS

| JP | 03-190338 | 8/1991 |
| JP | 10-078929 | 3/1998 |

(Continued)

OTHER PUBLICATIONS

Maegawa et al., U.S. Appl. No. 12/923,207, filed Sep. 9, 2010.

(Continued)

*Primary Examiner* — Kevin Bates
*Assistant Examiner* — Clarence D McCray
(74) *Attorney, Agent, or Firm* — Nixon & Vanderhye, P.C.

(57) ABSTRACT

There is provided a data collecting device configured to collect data from a plurality of nodes. An inquiry transmitting unit transmits inquiry messages to request transmission of the data to the nodes, respectively. A response receiving unit receives response messages including the data from the nodes, respectively. A reception scheduler generates a reception schedule of the response messages from the nodes based on request information indicating data collection condition from the nodes. A transmission scheduler generates a transmission schedule of the inquiry messages based on the reception schedule and characteristics of communication with the nodes. The inquiry transmitting unit transmits the inquiry messages to the nodes, respectively, based on the transmission schedule.

14 Claims, 27 Drawing Sheets

(56) References Cited

U.S. PATENT DOCUMENTS

| | | | |
|---|---|---|---|
| 6,711,137 | B1 | 3/2004 | Klassen et al. |
| 6,865,427 | B2 | 3/2005 | Brown et al. |
| 7,099,968 | B2 | 8/2006 | Rengarajan |
| 7,385,986 | B2 | 6/2008 | Ono et al. |
| 7,395,537 | B1 | 7/2008 | Brown et al. |
| 7,411,921 | B2* | 8/2008 | Strong et al. ............... 370/328 |
| 7,535,913 | B2* | 5/2009 | Minami et al. ............... 370/401 |
| 7,584,294 | B2* | 9/2009 | Plamondon ................... 709/233 |
| 7,644,171 | B2* | 1/2010 | Sturniolo et al. ............ 709/230 |
| 7,667,575 | B2* | 2/2010 | Husak et al. ................ 340/10.2 |
| 7,685,250 | B2 | 3/2010 | Connor et al. |
| 7,751,315 | B1 | 7/2010 | Pai et al. |
| 7,778,260 | B2* | 8/2010 | Sturniolo et al. ............ 370/401 |
| 7,808,913 | B2 | 10/2010 | Ansari et al. |
| 7,817,652 | B1 | 10/2010 | MacAdam et al. |
| 7,912,976 | B2 | 3/2011 | Guthrie et al. |
| 8,054,850 | B2 | 11/2011 | Demachi et al. |
| 8,094,647 | B2* | 1/2012 | Elliott et al. ................. 370/352 |
| 8,102,767 | B2 | 1/2012 | Marcellin |
| 8,122,145 | B2 | 2/2012 | Muhonen et al. |
| 8,132,054 | B2* | 3/2012 | Fu et al. .......................... 714/33 |
| 8,166,485 | B2* | 4/2012 | Krishnakumar et al. ...... 718/104 |
| 8,218,473 | B2* | 7/2012 | Connors et al. ............... 370/316 |
| 8,504,775 | B2* | 8/2013 | Plamondon ................... 711/133 |
| 8,537,708 | B2* | 9/2013 | Yabe et al. .................... 370/252 |
| 8,578,076 | B2* | 11/2013 | van Der Linden et al. ..... 710/72 |
| 8,638,217 | B2* | 1/2014 | Arms et al. ................. 340/539.1 |
| 2001/0024446 | A1 | 9/2001 | Craig et al. |
| 2002/0032777 | A1 | 3/2002 | Kawata et al. |
| 2003/0046339 | A1 | 3/2003 | Ip |
| 2003/0188013 | A1 | 10/2003 | Nishikado et al. |
| 2003/0216155 | A1 | 11/2003 | Kobayashi |
| 2004/0062267 | A1* | 4/2004 | Minami et al. ............... 370/463 |
| 2004/0172476 | A1 | 9/2004 | Chapweske |
| 2005/0018611 | A1* | 1/2005 | Chan et al. ................... 370/241 |
| 2005/0043037 | A1 | 2/2005 | Ioppe et al. |
| 2006/0195508 | A1* | 8/2006 | Bernardin et al. ............ 709/203 |
| 2007/0026881 | A1 | 2/2007 | Tzavidas et al. |
| 2007/0255116 | A1* | 11/2007 | Mehta et al. .................. 600/300 |
| 2007/0258395 | A1* | 11/2007 | Jollota et al. ................. 370/310 |
| 2008/0101406 | A1 | 5/2008 | Matoba |
| 2008/0168130 | A1* | 7/2008 | Chen et al. ................... 709/203 |
| 2008/0228978 | A1 | 9/2008 | Wei et al. |
| 2008/0229025 | A1* | 9/2008 | Plamondon ................... 711/126 |
| 2009/0210876 | A1 | 8/2009 | Shen et al. |
| 2009/0213871 | A1 | 8/2009 | Carlson et al. |
| 2009/0310490 | A1 | 12/2009 | Sekine |
| 2010/0095299 | A1 | 4/2010 | Gupta et al. |
| 2010/0149971 | A1 | 6/2010 | Noriega |
| 2011/0035752 | A1* | 2/2011 | Krishnakumar et al. ...... 718/103 |
| 2011/0066758 | A1 | 3/2011 | Maegawa et al. |
| 2011/0095883 | A1* | 4/2011 | Watts et al. ............... 340/539.11 |
| 2012/0057456 | A1* | 3/2012 | Bogatin et al. ............. 370/230.1 |
| 2012/0069131 | A1* | 3/2012 | Abelow ....................... 348/14.01 |
| 2012/0218966 | A1* | 8/2012 | Yamazaki et al. ............. 370/329 |
| 2012/0243509 | A1* | 9/2012 | Popovski et al. ............. 370/331 |
| 2014/0067450 | A1* | 3/2014 | Malkin et al. ................ 705/7.13 |

FOREIGN PATENT DOCUMENTS

| | | |
|---|---|---|
| JP | 2000-259520 | 9/2000 |
| JP | 2003-218981 | 7/2003 |
| JP | 2004-318421 | 11/2004 |
| JP | 2005-135286 | 5/2005 |
| JP | 2005-135644 | 5/2005 |
| JP | 2005-184616 | 7/2005 |
| JP | 2009-016889 | 1/2009 |
| JP | 2009-110196 | 5/2009 |

OTHER PUBLICATIONS

Wen-Ya Chung et al.; A Flexible Hierarchical and Distributed Control Kernel Architecture for Rapid Resource Integration of Intelligent Building Systems; 2001 IEEE International Conference on Robotics and Automation, Seoul, Korea; May 21, 2001; pp. 1981-1987.

Hong S.H. et al.; A Bandwidth Allocation Scheme on MS/TP Protocol; 2005 3rd Conference on Industrial Informatics; Perth, Australia; Aug. 10-12, 2005; pp. 523-528.

English-language machine translation of JP 2003-218981.

Updated English-language machine translation of JP2003-218981 (from JP 2002-17339, Jul. 31, 2003).

English-language machine translation of JP 2005-135644.

* cited by examiner

| IDENTIFIER 301 | DATA RECEIVING CYCLE 302 | RECEIVING TIME LIMIT 303 | BASE IDENTIFIER 304 |
|---|---|---|---|
| POINT 1 | 300 [sec] | 90 [sec] | BASE 1 |
| POINT 2 | 300 [sec] | 90 [sec] | BASE 1 |
| POINT 3 | 300 [sec] | 40 [sec] | BASE 1 |
| POINT 4 | 300 [sec] | 40 [sec] | BASE 1 |
| ... | ... | ... | ... |
| POINT "a" | 150 [sec] | — | BASE 2 |
| POINT "b" | 150 [sec] | — | BASE 3 |
| POINT "c" | 150 [sec] | — | BASE 4 |
| POINT "d" | 150 [sec] | — | BASE 5 |

FIG. 3

COMMUNICATION CHARACTERISTICS

| IDENTIFIER | RTT |
|---|---|
| POINT "a" | 10 [msec] |
| POINT "b" | 12 [msec] |
| POINT "c" | 6 [msec] |
| POINT "d" | 10 [msec] |

FIG. 6

COMMUNICATION CHARACTERISTICS

| IDENTIFIER | ONE-WAY DELAY |
|---|---|
| POINT "a" | 6 [msec] |
| POINT "b" | 6 [msec] |
| POINT "c" | 3 [msec] |
| POINT "d" | 5 [msec] |
| ......... | ......... |

FIG. 12

COMMUNICATION CHARACTERISTICS

| IDENTIFIER | RTT | BASE IDENTIFIER | MINIMUM TIME INTERVAL |
|---|---|---|---|
| POINT "a" | 10 [msec] | BASE A | 4 [sec] |
| POINT "b" | 12 [msec] | BASE A | 4 [sec] |
| POINT "c" | 6 [msec] | BASE A | 4 [sec] |
| POINT "d" | 10 [msec] | BASE A | 4 [sec] |

FIG. 24

| | IDENTIFIER | RTT | BASE IDENTIFIER | MINIMUM TIME INTERVAL |
|---|---|---|---|---|
| 2511 | POINT "a" | 10 [msec] | BASE A | 8 [sec] |
| 2512 | POINT "b" | 12 [msec] | BASE A | 8 [sec] |
| 2513 | POINT "c" | 6 [msec] | BASE A | 8 [sec] |
| 2514 | POINT "d" | 10 [msec] | BASE A | 8 [sec] |
| | 2501 | 2502 | 2503 | 2504 |

FIG. 26

DATA COLLECTING DEVICE, COMPUTER READABLE MEDIUM, AND DATA COLLECTING SYSTEM

CROSS REFERENCE TO RELATED APPLICATIONS

This application is based upon and claims the benefit of priority from the prior Japanese Patent Application No. 2011-5091, filed on Jan. 13, 2011, the entire contents of which are incorporated herein by reference.

FIELD

Embodiments of the present invention relate to a data collecting device, a computer readable medium, and a data collecting system and relate to, for example, a device that collects data based on request information about data collection and restrictions on a network environment.

BACKGROUND

Energy saving in facilities such as houses and office buildings has been an important issue for countermeasures against global warming, effective utilization of energy resources, and reduction in energy usage cost.

Recently, attempts have been made to: remotely collect information about the working state or energy consumption of equipment devices of the facilities; visualize, for administrators of the facilities or users of the facilities, data such as the energy consumption of the equipment devices or results obtained by subjecting the data to statistical processing via a LAN (Local Area Network) or a wide-area communication network (WAN (Wide Area Network)); and encourage energy saving activities of tenants or monitor/control electric power systems containing natural energy, dispersed power sources, storage batteries, and/or electric vehicles. Realizing high-quality and highly-efficient information collecting techniques is required in order to realize these attempts.

The configuration of an information system that realizes these attempts can be roughly divided into three, i.e.: (1) a device or software for visualization or monitoring/controlling; (2) communication media and communication devices for outputting the data such as energy consumption from the equipment devices in the facilities via a LAN or a WAN; and (3) a data collecting system, which collects the data via the communication devices, the LAN, or the WAN and provides the data to (1).

The data collecting system is required to carry out high-quality and highly-efficient collection of data such as energy consumption from the equipment devices in the facilities mainly via the wide-area communication network.

Herein, the "high quality" is realized when the data collecting system satisfies the conditions (for example: data collection at constant intervals, defectless data collection, and data collection that keeps time limit specified by an application) required by the application (for example: the above described device or software for visualization or monitoring/controlling), which uses the collected data. In order to do this, the data collecting system requires a function that receives inputs of requests of the application about the data collection and a function that interprets the requests and controls data collecting operations.

The "high efficiency" is realized when the data collecting system collects as much data as possible at a higher frequency within the range of restrictions (examples: upper limit of data inquiry frequency, and the communication band of the data collecting system) on communication of the facilities and equipment devices serving as the targets from which data is to be collected. In order to do this, a function that recognizes the restrictions on the communication and a function that controls the data collecting operations based on the restrictions on the communication are required.

Particularly, outputting data with the intermediation of the wide-area network is not a presupposition for the processing abilities of the communication media and communication equipment connected to the facilities and equipment devices, and the processing abilities are often lower than those of general information processing devices. Therefore, it is important for the data collecting system to carry out the data collecting operations that take the restrictions into consideration.

Herein, a technique that periodically collects data of, for example, sensors from a plurality of communicating nodes is used in a communicating system used in the monitoring and control of mechanical equipment and electric equipment in properties such as factories and offices; however, carrying out the data collection via the wide-area communication network is not sufficiently taken into consideration.

For the disaster prevention applications and so on, data collection of, for example, sensors at remote locations is also carried out; however, communication lines having ensured communication quality (for example: communication bands and working rates) are used in many cases, and carrying out the data collection via the communication network having comparatively low quality is not sufficiently taken into consideration.

As described above, in the operation in which the data collecting system collects the data about the equipment devices installed in the facilities via the wide-area communication network, there have been problems that the control of the data collecting operation based on the characteristics of communication with the equipment devices of the facilities via the communication network cannot be carried out and that the requests from the above described application about the data collection cannot be satisfied.

BRIEF DESCRIPTION OF THE DRAWINGS

FIG. 3 is a drawing showing an example of the information contained in response reception requests;

FIG. 6 is a drawing showing an example of communication characteristics;

FIG. 12 is a drawing showing an example of communication characteristics;

FIG. 24 is a drawing showing an example of the communication characteristics;

FIG. 26 is an example showing an example of the communication characteristics.

DETAILED DESCRIPTION

Figure 1:
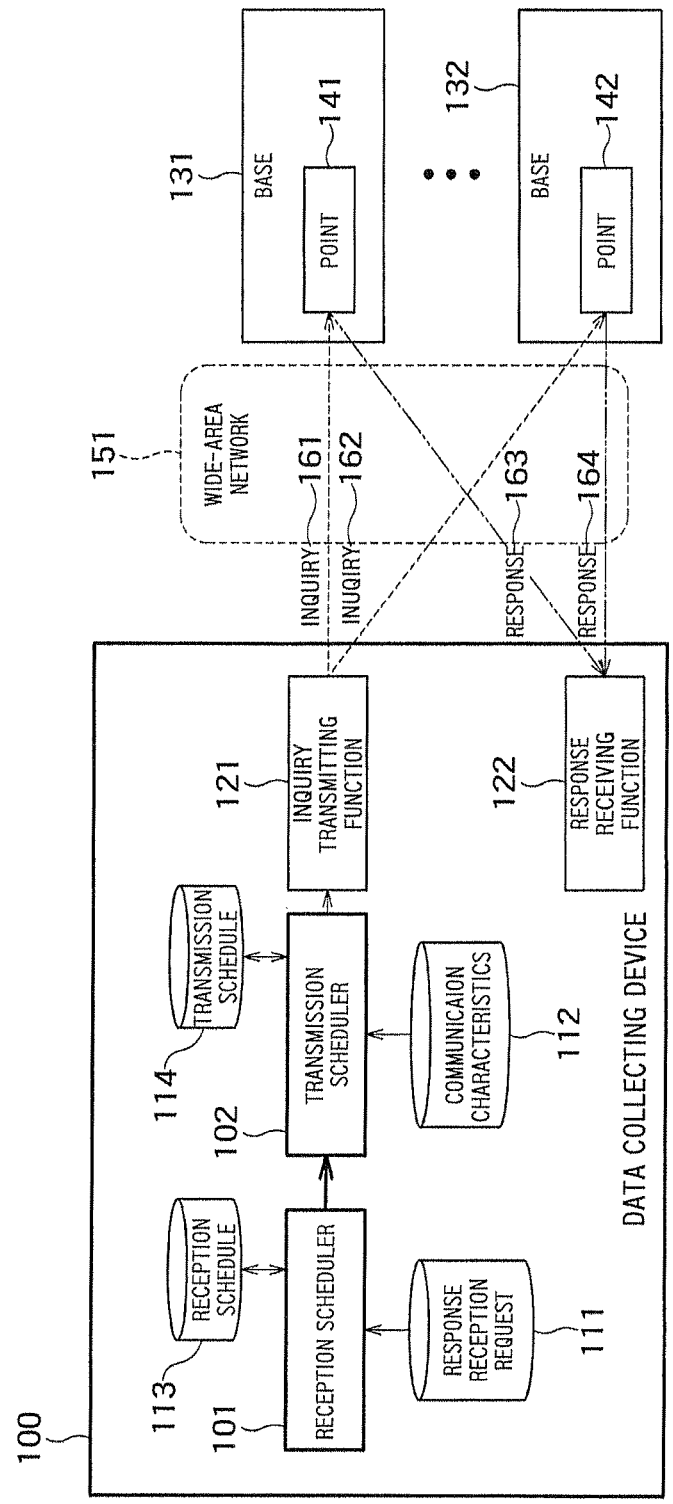
FIG. 1 is a drawing showing a configuration of a data collecting device according to a first embodiment.

According to one embodiment, there is provided a data collecting device configured to collect data from a plurality of nodes. The data collecting device includes an inquiry transmitting unit, a reception scheduler, a transmission scheduler and an inquiry transmitting unit.

The inquiry transmitting unit transmits inquiry messages to request transmission of the data to the nodes, respectively.

The response receiving unit receives response messages including the data from the nodes, respectively.

The reception scheduler generates a reception schedule of the response messages from the nodes based on request information indicating data collection condition from the nodes.

The transmission scheduler generates a transmission schedule of the inquiry messages based on the reception schedule and characteristics of communication with the nodes.

The inquiry transmitting unit transmits the inquiry messages to the nodes, respectively, based on the transmission schedule.

Hereinafter, embodiments of the present invention will be explained based on drawings.

(First Embodiment)

A configuration of a data collecting device 100 according to the first embodiment will be explained with reference to FIG. 1.

The data collecting device 100 is provided with an inquiry transmitting function (inquiry transmitting unit) 121 and a response receiving function (response receiving unit) 122 for collecting data from bases such as a base 131 and a base 132 via a wide-area network 151. The inquiry transmitting function 121 transmits an inquiry message 161 and an inquiry message 162 to the bases. The response receiving function 122 receives response messages such as a response message 163 and a response message 164 from the bases.

Furthermore, the data collecting device 100 is provided with a reception scheduler 101 and a transmission scheduler 102 for determining the time at which the inquiry transmitting function 121 is to transmit inquiry messages such as the inquiry message.

The reception scheduler 101 refers to the information (request information) of response reception requests 111 and determines the time (=a reception schedule 113) at which the response receiving function 122 is to receive the response messages. The response reception requests 111 are request conditions about the reception schedule 113 and refer to, for example, receiving cycles and receiving time limits of the response messages set depending on application software or service software which utilize collected data, and details thereof will be described later.

The transmission scheduler 102 refers to the reception schedule and communication characteristics 112 and determines the time (=a transmission schedule 114) at which the inquiry transmitting function 121 is to transmit the inquiry messages. The communication characteristics 112 are restricting conditions about the transmission schedule and mean, for example, the time taken from the point when the inquiry transmitting function 121 transmits each of the inquiry messages until the response receiving function 122 receives the response message (hereinafter, described as "RTT" (an abbreviation of "Round Trip Time") and a maximum message number of inquiry messages which can be transmitted to each base per unit time, and details thereof will be described later.

The inquiry transmitting function 121 transmits the inquiry messages to the bases in accordance with the information of the transmission schedule.

Note that the inquiry transmitting function 121 may repeatedly transmit inquiry messages over a plurality of times (a plurality of cycles) in accordance with the information of the transmission schedule. By virtue of this, time series data can be collected from each of points of the bases.

Note that the above described functions that the data collecting device 100 has are capable of obtaining effects of the present application by various implementation. For example, each function may be implemented as an arithmetic device of independent hardware, may be implemented as software which can be executed in an arithmetic device (CPU) that the data collecting device 100 has, or may be implemented by a combination thereof.

The point 141, the point 142, etc. belonging to the bases, respectively, refer to various sensors or various actuators which are also called, for example, monitoring points or controlling points. Examples of the various sensors include: temperature sensors, humidity sensors, rain sensors, human sensors, smoke sensors, electric power meters, flow rate meters, and information processors, which output the processing load or working state of information processing, wherein the sensors, etc. are installed at equipment of the bases. Examples of the various actuators include: electric power breakers; switches; controllers of motors, pumps, etc.; controllers of air conditioning, illumination, etc.; controllers of doors, flapper gates, etc.; controllers of light or information displaying devices; and information processors, which receive operations from outside.

Note that, although the example in which the number of the points belonging to each base is one is shown in FIG. 1, the number is not particularly limited, and a plurality of points may belong to each base.

Figure 2:
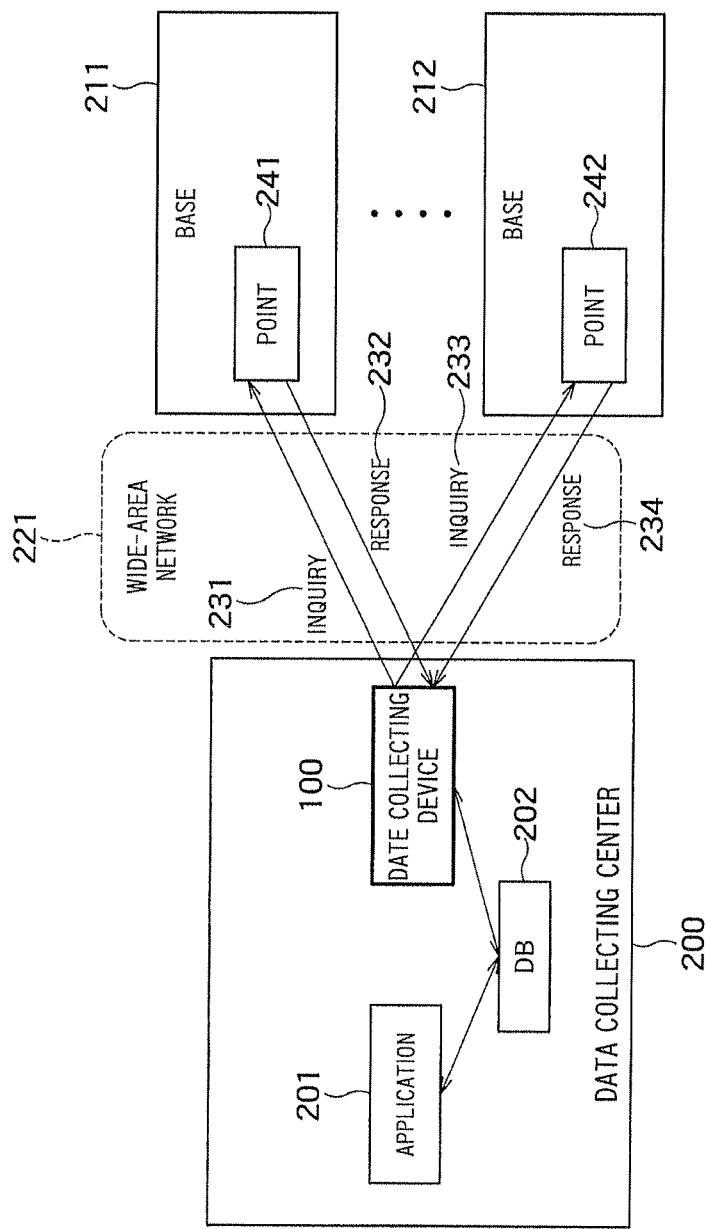
FIG. 2 is a drawing showing a utilization form of the data collecting device.

An outline of a utilization form of the data collecting device 100 will be explained with reference to FIG. 2. However, the utilization form explained herein is merely an example, and the effects obtained by the present application are not limited by this utilization form.

A data collecting center 200 is a device or a facility storing the data collecting device 100 and refers to, for example, a server farm or a data center connected to a wide-area network 221.

A DB (database) 202 is a storage for storing the data collected by the data collecting device 100 and refers to, for example, a readable/writable storage composed of a storage medium such as a hard disk drive or a SSD (Solid State Drive).

An application 201 is a main part that utilizes the data collected by the data collecting device 100 and refers to, for example, a part that executes arithmetic processing based on the collected data to output statistical information or carries out a predetermined determining process based on the collected data to generate control orders to the bases. Furthermore, the application 201 transmits the request information, which is used when the data collecting device 100 collects data, to the data collecting device 100. The data collecting device recognizes the request information as the response reception requests 111.

The data collecting device 100 collects data from a point 241 of each base 211 based on the response reception requests 111 transmitted from the application 201 and records the data in the DB 202. As a result, the application 201 can obtain the data based on the response reception requests 111.

An example of the information included in the response reception requests 111 will be explained with reference to FIG. 3. The response reception requests 111 include identifiers 301 of respective points of each base, data receiving cycles 302, and reception time limits 303. The identifier 301 is the information for identifying each of the points and can be expressed by, for example, a destination address, a host name, or a URI (Unified Resource Identifier) of the inquiry message transmitted by the data collecting device 100. The data receiving cycle 302 refers to a time interval when the data collecting device 100 repeatedly collects data. The receiving time limit 303 refers to the time limit until which the data collecting device 100 is supposed to carry out reception (time allowed from the beginning of one cycle until reception of data). In the example of FIG. 3, a receiving time limit of 90 seconds is specified in a data collecting cycle with respect to a point 1 and a point 2, and a time limit of 40 seconds is specified in a data collecting cycle with respect to a point 3 and a point 4. All of a point "a" to a point "d" have a data collecting cycle of 150 seconds, and the receiving time limits thereof are not particularly specified. Note that base identifiers 304 are the information expressing in which bases the points are installed; however, this information is not the information that is necessary for implementing the present application, but may be added if this is to be referred to by the reception scheduler 101, which will be described later.

An example of an operation of the reception scheduler 101 will be explained with reference to FIG. 4 and FIG. 5.

The reception scheduler 101 determines "approximate" time (hereinafter, described as "receiving time range") serving as a target at which the data collecting device 100 is to receive the response from each point of each base. Note that the above described reception schedule 113 refers to a combination of the receiving time ranges of the respective points.

Upon determination of the receiving time ranges, the reception scheduler determines the receiving time ranges so that the receiving time limits 303 determined in the response reception requests 111 are satisfied and that the receiving time ranges of the respective points are distributed smoothly as much as possible in the direction of time without being unevenly distributed to certain time.

An example of a procedure that realizes this will be explained with reference to FIG. 4. First, the receiving cycle and the receiving time limit are referred to according to the response reception requests 111 (401). Then, a receiving time range is tentatively determined according to the receiving cycle and the receiving time limit (402). Herein, for example, if the receiving time range of the point 1 of FIG. 3 is to be determined, the receiving cycle 302 is 300 seconds, and the receiving time limit is 90 seconds; therefore, the receiving time range can be determined somewhere from the beginning to 90 seconds in one cycle (=300 seconds). FIG. 5 shows an example in which the receiving time range of the point 1 is tentatively determined at 40 to 50 seconds.

Then, it is judged whether the receiving time ranges of the reception schedule are smooth or not in the direction of time (unevenly distributed or not) as a result of adding the tentatively determined receiving time range (403). If smooth ("YES" in 403), the tentatively determined receiving time range is added to the reception schedule (404). On the other hand, if non-smoothness is determined ("NO" in 403), the operation of tentatively determining the receiving time range again in a different time range (402) and determining whether it is smooth or not (403) is repeated. Setting an upper limit of the number of repetition is more suitable since an infinite loop can be avoidable; however, it is not necessary.

Figure 4:
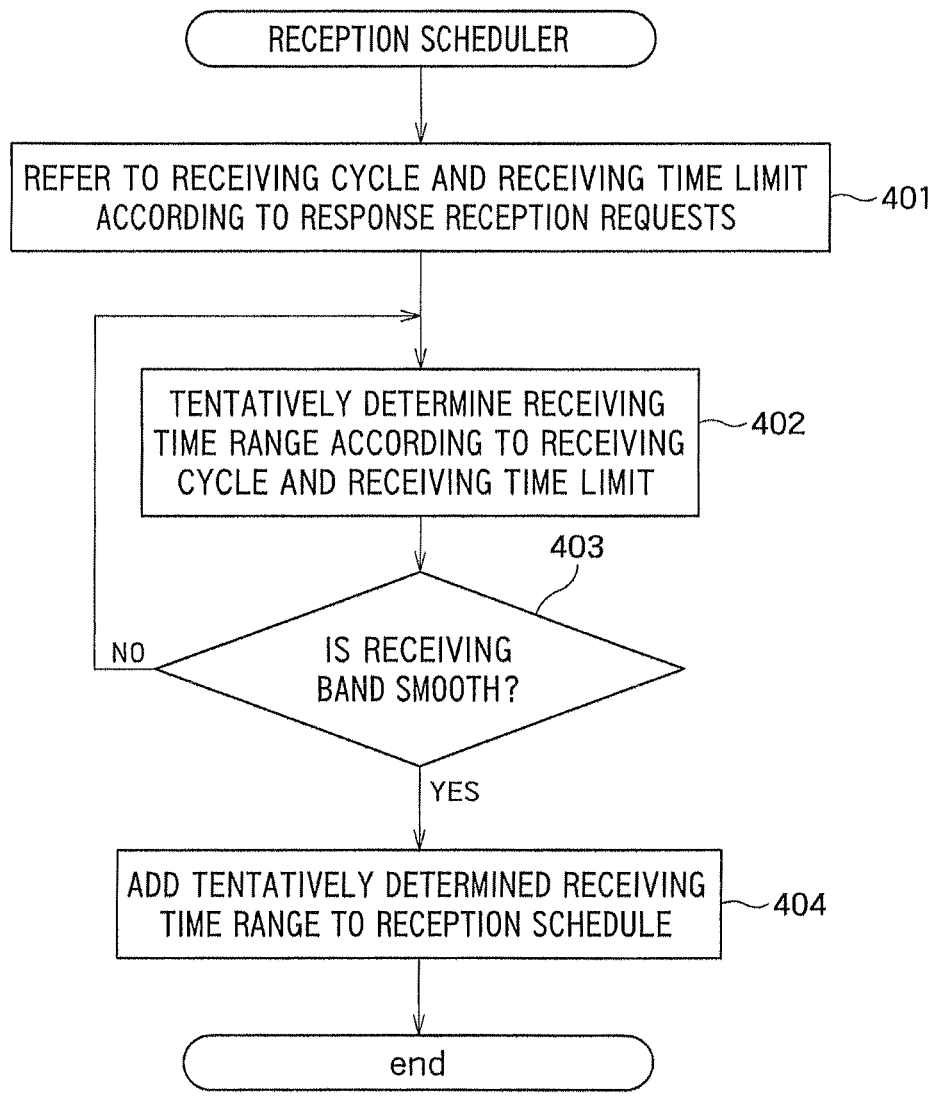
FIG. 4 is a drawing showing an example of an operation of a reception scheduler.

The method that smoothens the receiving time ranges in the reception schedule in the direction of time is not limited to the processing flow of FIG. 4. For example, in step 402, a uniform random number is generated upon the tentative determination of the receiving time range, and the receiving time range is tentatively determined in accordance with the random number; in this case, the receiving time ranges tentatively determined for the points are supposed to be uniformly disposed spontaneously, and the determination like that of step 403 is not required.

Furthermore, conditions of the dependency relation between the points may be taken into consideration before adding the receiving time range of the reception schedule to the reception schedule (404).

For example, setting may be implemented so that the responses from the points belonging to the same base are received at the time mutually close as much as possible by referencing the base identifiers 304 included in the response reception requests 111 of FIG. 3 and setting the receiving time ranges of the points, which belong to the same base, to be close to each other in terms of time as much as possible.

As an opposite example, the effect of reducing the communication processing load of each of the bases can be expected when the processes of returning responses from the same base are prevented from concentrating in a certain period of time by referencing the base identifiers 304 included in the response reception requests 111 of FIG. 3 and setting the receiving time ranges of the points, which belong to the same base, to be dispersed in terms of time as much as possible.

Figure 5:
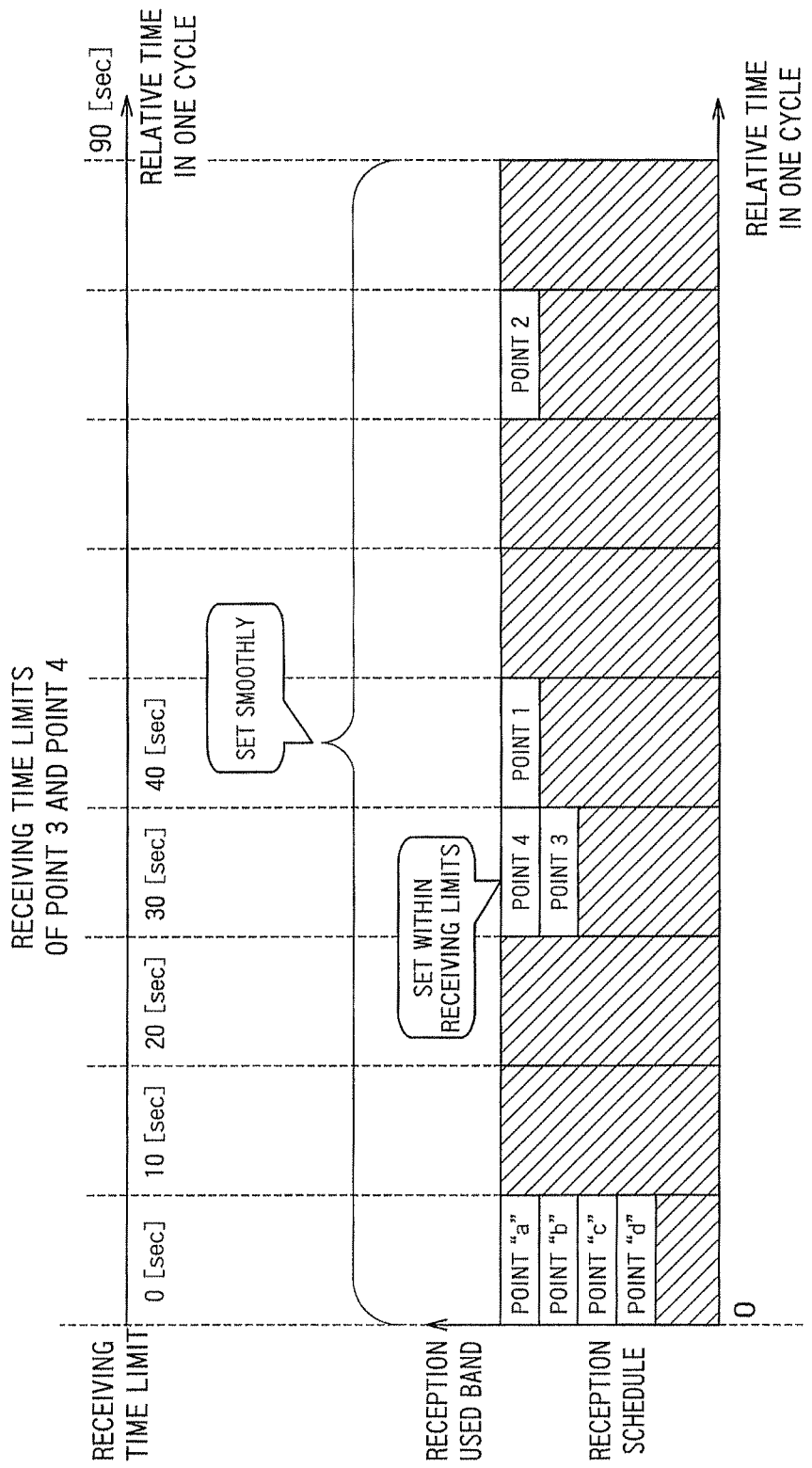
FIG. 5 is a drawing showing an example of a reception schedule.

Herein, in the example of the reception schedule shown in FIG. 5, the duration of the time ranges of the receiving time ranges of the respective points is uniformly set to 10 seconds; however, this is merely an example. For example, the duration of the time ranges may be uniformly set to, for example, 1 second or 60 seconds or may not be uniform. These are only required to be set to have finer resolving power than the values of the receiving cycles and the receiving time limits of the response reception requests 111 shown in FIG. 3.

These can be determined depending on the convenience of the application 201, which utilizes the data collected by the data collecting device 100, and the DB 202. In the present application, when the reception scheduler adds conditions in accordance with the convenience, the data collection further matching the convenience of the application 201, the DB 202, and the bases can be executed.

An example of the information included in the communication characteristics 112 will be explained with reference to FIG. 6. The communication characteristics 112 include identifiers 601 and RTT 602 of the respective points. The definition of the identifiers 601 is the same as that of the identifiers 301 in FIG. 3. The RTT 602 refers to the time taken from transmission of each of the inquiry messages by the inquiry transmitting function 121 until reception of each of the response messages by the response receiving function 122 (hereinafter, described as "RTT" (an abbreviation of Round Trip Time)). If RTT of the respective points is present, this information may be used as the RTT 602; alternatively, inquiry messages may be transmitted to the points, respectively, the time taken until responses are received may be measured, and this information may be used. Furthermore, the RTT 602 may be a single value such as an average value or a median value of RTT about each point or may be further combined with a statistical value(s) such as dispersion, standard deviation, a minimum value, and a maximum value.

Furthermore, as the information included in the communication characteristics 112, base identifiers indicating to which bases the points represented by the identifiers 601 belong may be included, and a minimum time interval at which the inquiry messages are transmitted to the bases or points may be included. If the information is provided in the case in which the inquiry messages cannot be received at a high frequency due to a low processing ability of a communication device such as a gateway, which transmits the response of a certain point, adjustment can be carried out so that the frequency of transmitting the inquiry messages by the data collecting device 100 is suppressed to be low by referencing the minimum time interval. This example will be described later in the third embodiment.

An example of an operation of the transmission scheduler 102 will be explained with reference to FIG. 7 to FIG. 9. The transmission scheduler 102 determines transmitting time for the points, respectively, so that responses can be received along with the reception schedule generated by the reception scheduler 101. An assembly of the transmitting time corresponds to the transmission schedule 114.

The example of the operation of the transmission scheduler will be explained with reference to FIG. 7. Herein, a procedure of the case in which transmitting time is determined for the point "a" shown in FIG. 6 will be shown as an example. First, the transmission scheduler refers to the receiving time range according to the reception schedule transmitted from the reception scheduler 101 (701) and further refers to the information of the RU 602 according to the communication characteristics 112 (702). Note that step 701 and step 702 are in random order.

Then, the transmission scheduler 102 calculates a transmitting time range from the receiving time range and the RTT 602 (703).

Herein, three examples will be explained as the method of calculating the transmitting time range.

First, a comparatively simple method includes a method in which the values obtained by subtracting the value of the RTT 602 of the communication characteristics 112 from the values of a smallest end and a largest end of the receiving time range serve as a smallest end and a largest end of a transmitting time range. More specifically, for example in the case of the point "a", the receiving time range is 0 to 10 [sec] according to FIG. 5; and, the RU 602 of the point "a" is 10 [msec] according to FIG. 6, therefore, −0.010 to 9.990 [sec] is obtained as the transmitting time range. However, even when a negative value such as −0.010 [sec] serving as the smallest end of the transmitting time range is rounded to 0.000 [sec], there is no big difference in the effects thereof.

Next, in the case in which the RTT of each of the points is not constant, but has a time variation, it is conceivable to express the RTT 602 of the communication characteristics 112 as a plurality of statistical values such as a smallest value and a largest value.

Figure 21:
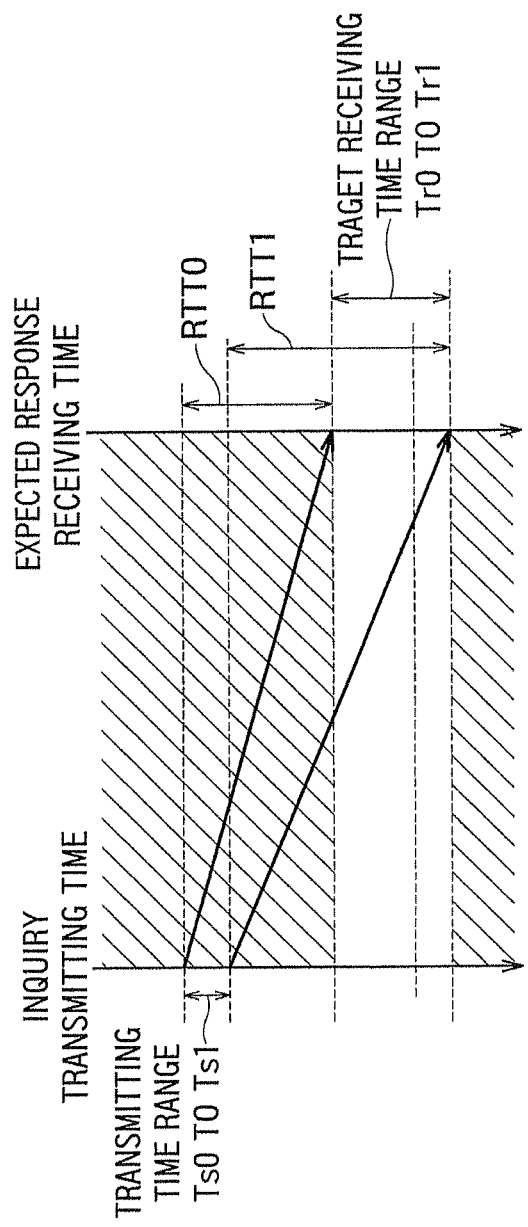
FIG. 21 is a drawing for explaining an example of a method of determining a transmitting time range in the case in which RU is expressed by a smallest value and a largest value.

An example of the method of determining the transmitting time range in the case in which the RTT 602 is expressed by the smallest value and the largest value will be explained with reference to FIG. 21. If the RTT about each point undergoes time variation, attention has to be paid upon determination of the transmitting time since it is difficult to predict response receiving time. Herein, as an example, the smallest value and the largest value of the RTT and the smallest value and the largest value of the receiving time range are determined in the following manner.

The smallest value of RTT=RTT0
The largest value of RTT=RTT1
The smallest value of the receiving time range=Tr0
The largest value of the receiving time range=Tr1

A smallest value and a largest value of the transmitting time range are determined in the following manner.

The smallest value of the transmitting time range=Ts0
The largest value of the transmitting time range=Ts1

The way to obtain the smallest value and the largest value of the transmitting time range can be obtained by, for example, following mathematical expressions. The following mathematical expressions are the mathematical expressions of the case in which the transmitting time range that causes the actual receiving time to be always within the receiving time range is obtained.

$$Ts0 = Tr0 - RTT0$$

$$Ts1 = Tr1 - RTT1$$

According to the above described method, Ts0 and Ts1 are calculated so that: when transmission is carried out at the time after Ts0, the earliest time of reception becomes Tr0; and, when transmission is carried out before Ts1, the latest time of reception becomes Tr1.

Figure 7:
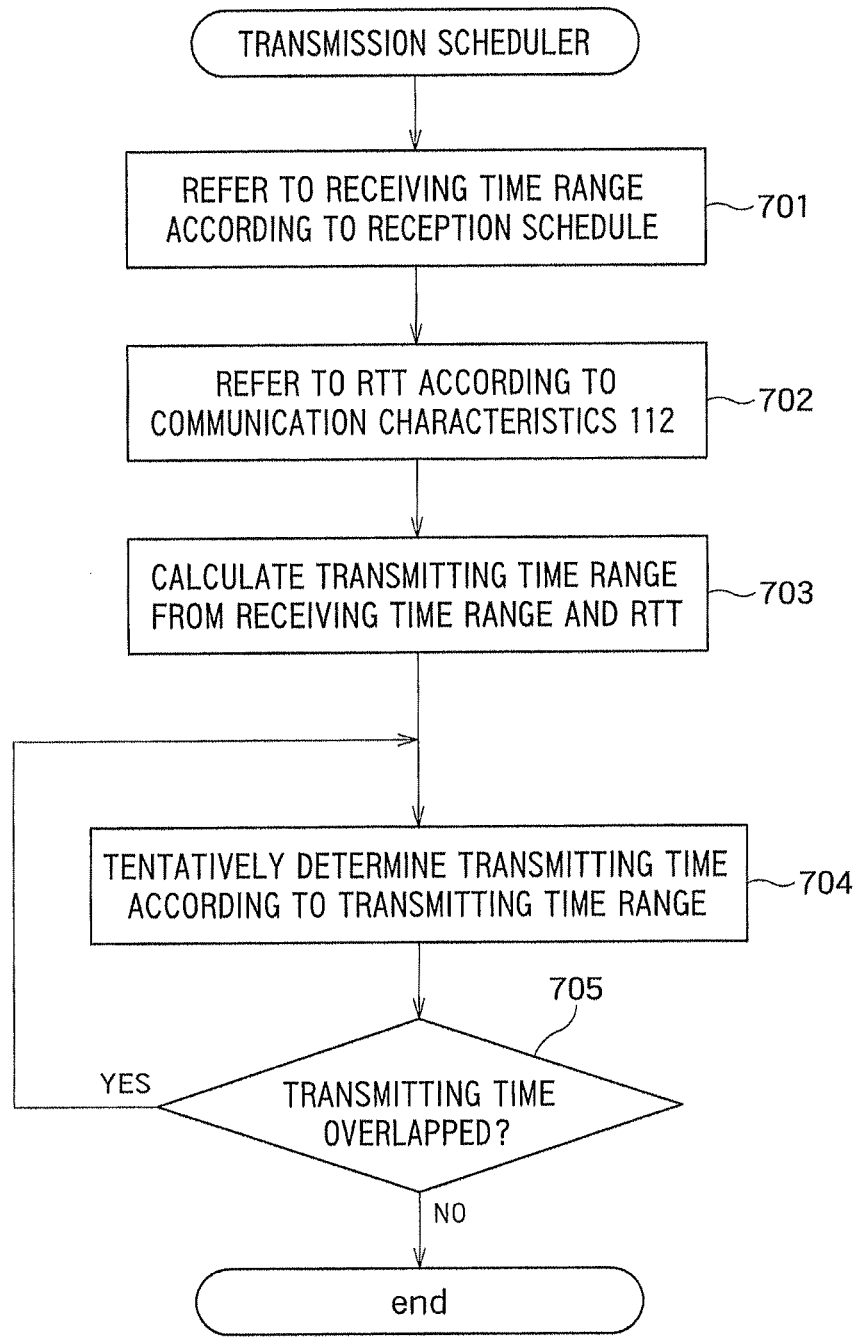
FIG. 7 is a drawing showing an example of an operation of a transmission scheduler.

The explanation is returning to the explanation of the operation of the transmission scheduler referencing FIG. 7. Herein, for the brevity of the explanation hereinafter, the explanation will be given on the assumption that the dispersion of the RTT of each point is 0, in other words, the RTT does not undergo time variation for each point.

The transmission scheduler 102 tentatively determines transmitting time according to the transmitting time range (704). Upon the tentative determination of the transmitting time, arbitrary time within the transmitting time range may be randomly determined tentatively, or the tentative determination may be made so that a gradual increase is made from the smallest value or the largest value of the transmitting time range.

Furthermore, the transmission scheduler 102 refers to the transmission schedule 114 and determines whether the tentatively determined transmitting time is overlapped with the transmitting time of the inquiry messages for the other points or not (705). If overlapped ("YES" in 705), different transmitting time is tentatively determined again (704). If not overlapped, the transmitting time is determined.

Note that, in step 705, determination of checking whether the response receiving time at which a response message from the point "a" is expected to be received is overlapped with the receiving time of the response messages from the other points or not may be carried out. By virtue of this, the possibility that the time at which the data collecting device 100 receives the response message from the point "a" is overlapped with the time at which the response messages from the other points are received can be reduced.

Figure 8:
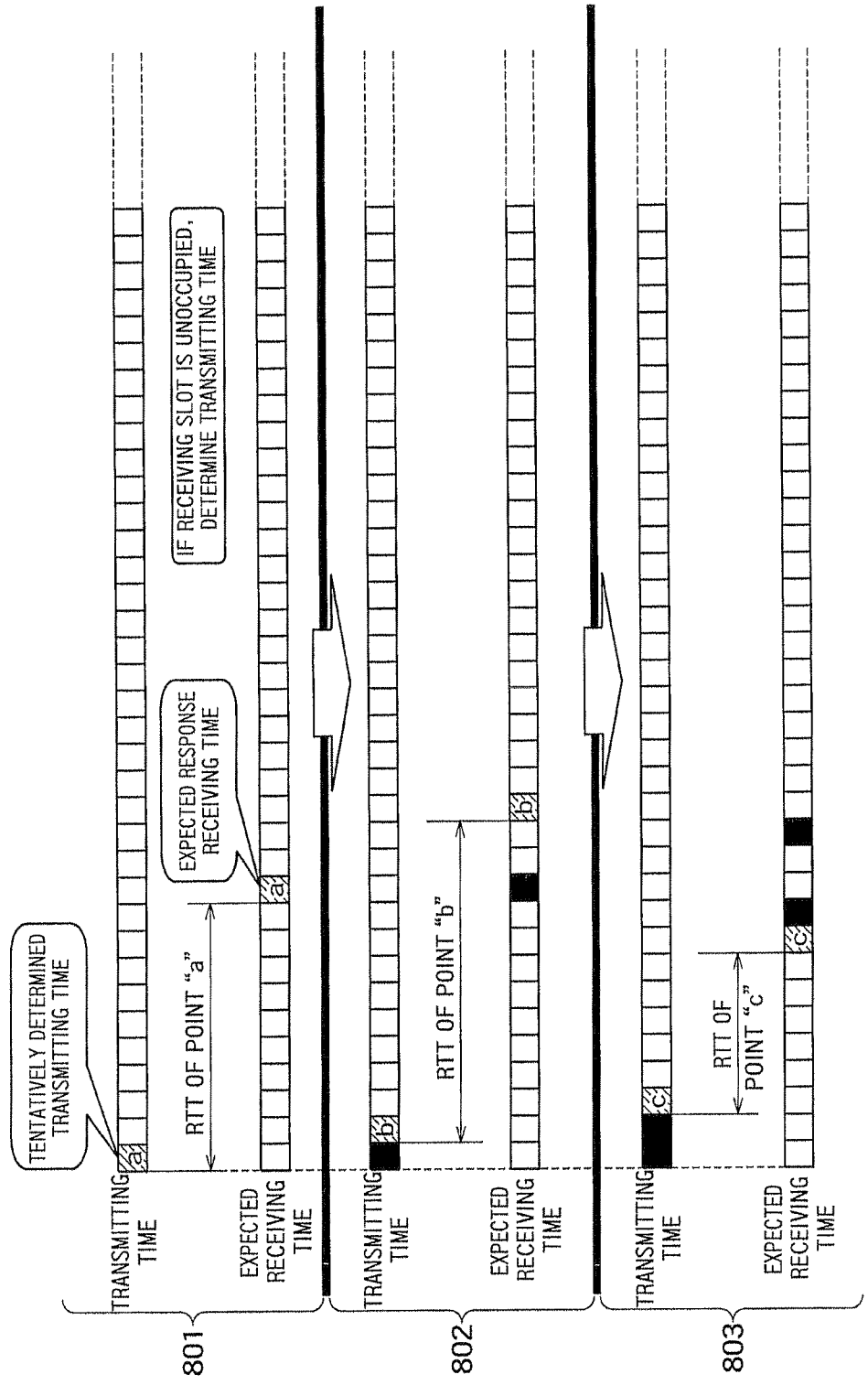
FIG. 8 is a drawing showing a process of generating the transmission schedule.
Figure 9:
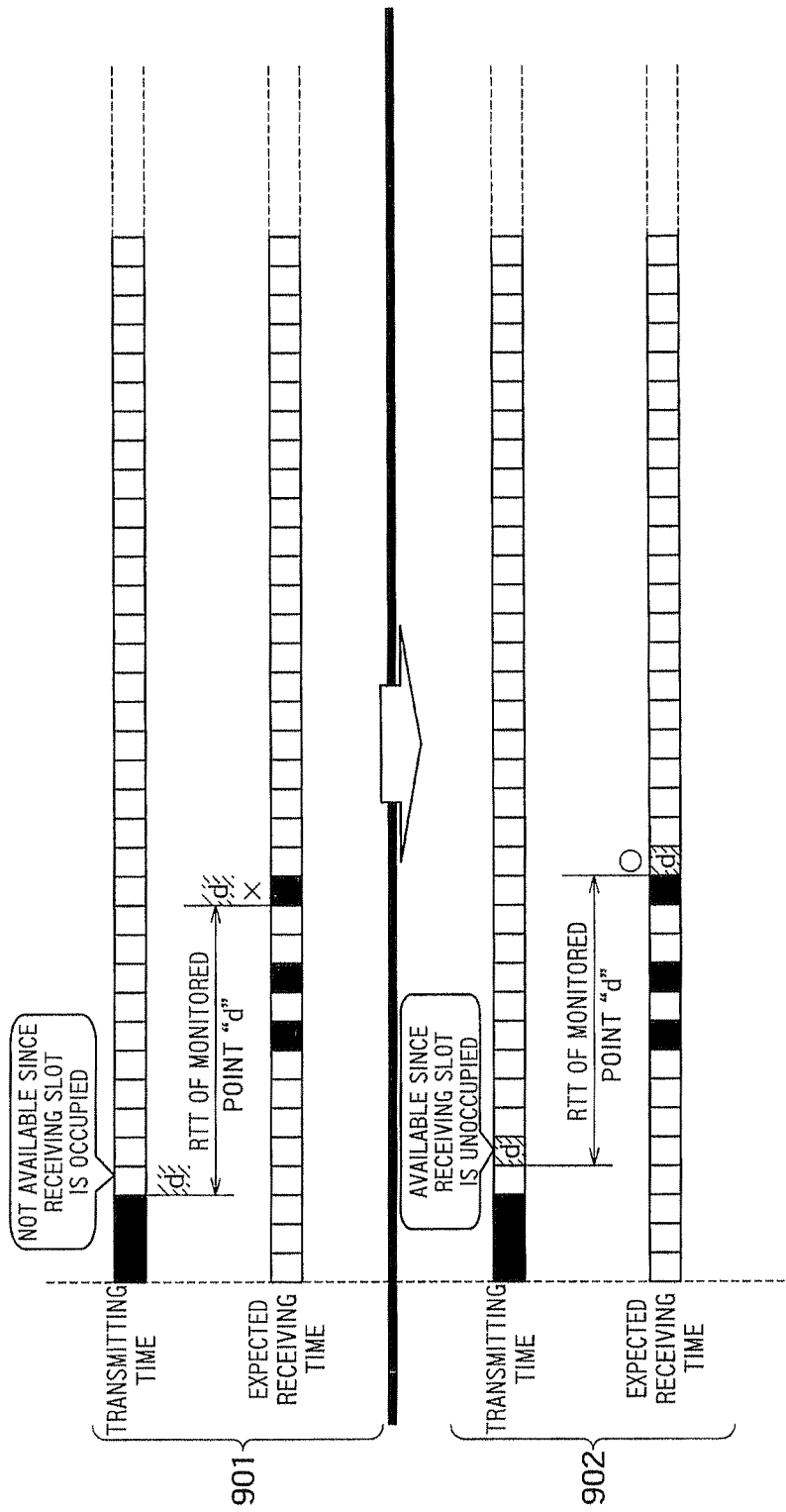
FIG. 9 is a drawing showing the process of generating the transmission schedule.

A specific example of the operation of the transmission scheduler 102 shown in FIG. 7 will be shown with reference to FIG. 8 and FIG. 9. Note that this example is the example in which presence of overlapping of not only the transmitting time of the inquiry messages for the points, but also the receiving time is determined in step 705 of FIG. 7. Herein, in order to simplify the expression of the transmitting time and the receiving time, the time taken for transmitting/receiving inquiry messages or response messages are expressed by slots, and the overlapping of the transmitting time or the receiving time is expressed by whether the slots are unoccupied or occupied.

Herein, as an example, first, the transmitting time of the point "a" is determined (801). Since the receiving time range of the point "a" is 0 to 10 [sec], the transmitting time range thereof is 0.000 to 9.990 [sec] (wherein, "−0.010 [sec]" which is the smallest end of the transmitting time range is rounded to 0.000 [sec]).

Then, when the transmitting time is tentatively determined in the manner of 801 of FIG. 8, the receiving slot and the transmitting slot are both unoccupied. Therefore, the receiving time and the transmitting time are not overlapped with other messages. Therefore, the tentatively determined transmitting time is determined as the transmitting time in 801 of FIG. 8.

Then, the transmitting time of the point "b" and the point "c" is determined (802, 803). Herein, the transmitting time can be determined in a manner similar to the case of 801.

On the other hand, 901 of FIG. 9 shows an example of the case in which expected response receiving time is overlapped with the response receiving time of the point "c" upon determination of the transmitting time of the point "d". In this case, the transmitting time is determined so that the response receiving time is not overlapped therewith (902).

Figure 23:
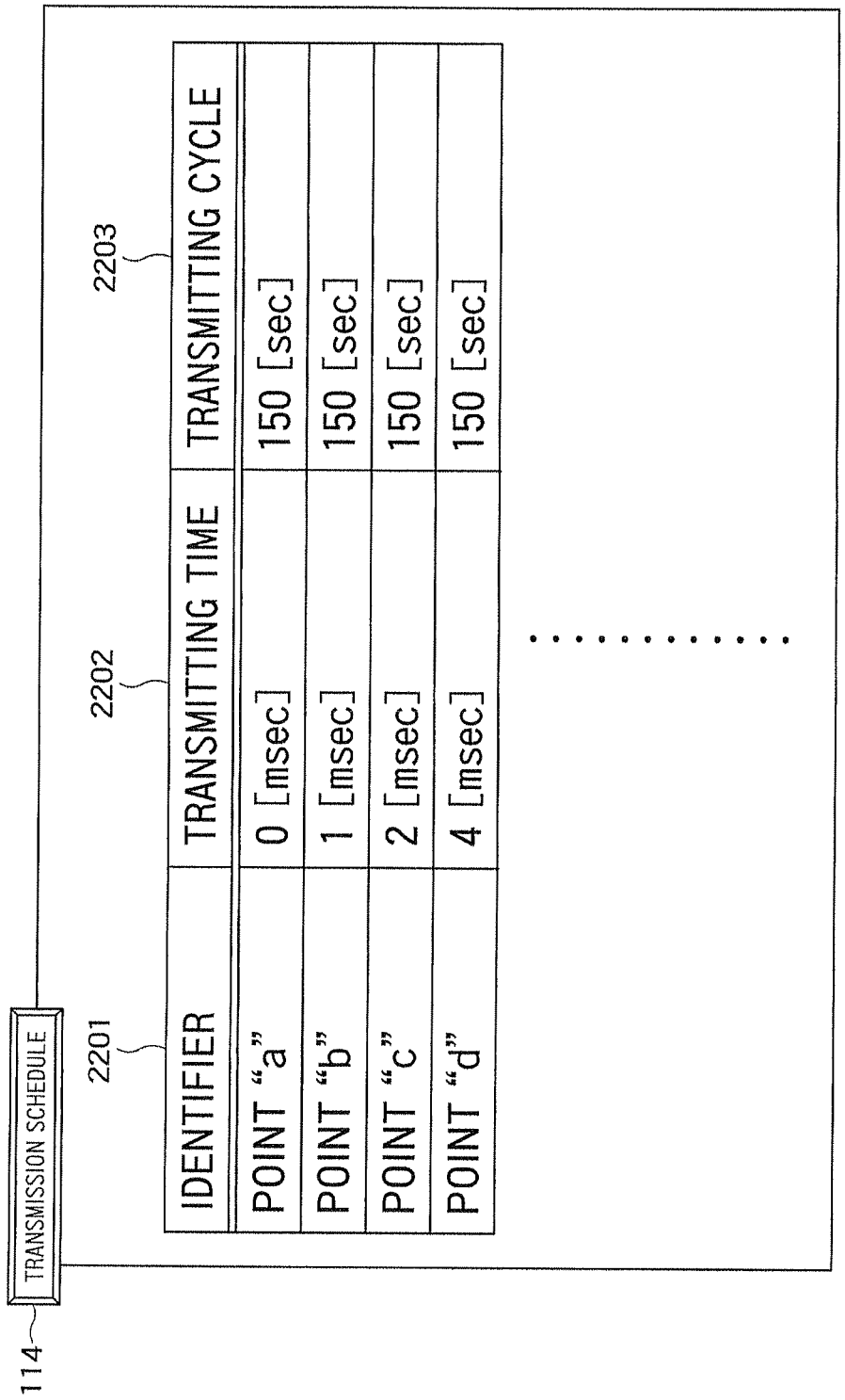
FIG. 23 is a drawing showing an example of the transmission schedule.

As described above, when the transmitting time of the points is determined, the combination becomes the transmission schedule 114. FIG. 23 shows an example of the information included in the transmission schedule 114.

Figure 10:
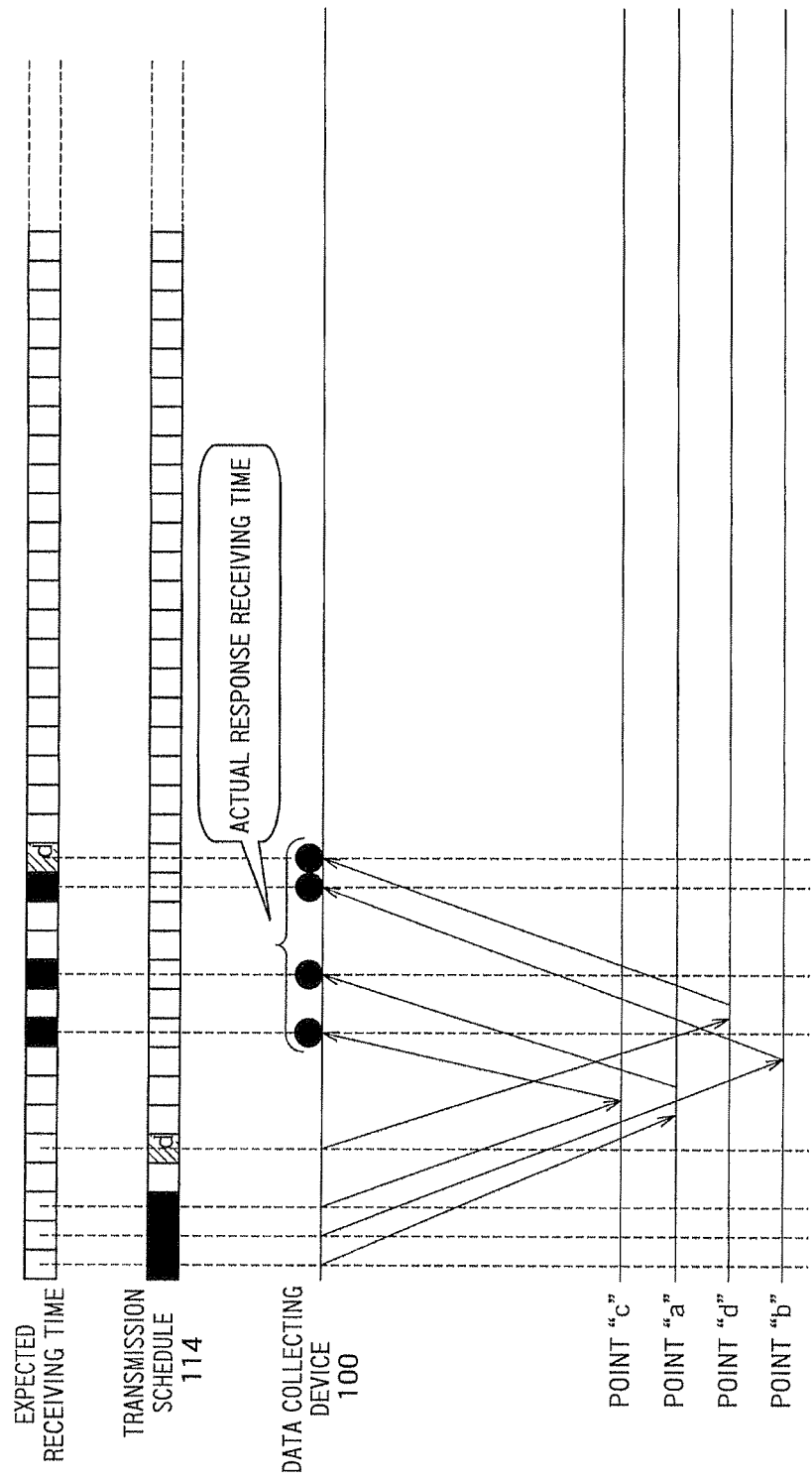
FIG. 10 is a drawing showing an example of a communication sequence in the case in which data collection is carried out based on the generated transmission schedule.

FIG. 10 shows an example of a communication sequence in the case in which data collection is carried out based on the transmission schedule 114 as shown in FIG. 23, which is generated by an operation as described above. If the time (RTT) from transmission of an inquiry from the data collecting device 100 until reception of a response is equal to the RTT 602 that has been referred to when the transmission scheduler 102 generated the transmission schedule 114, the receiving time is supposed to be prevented from overlapping as shown in FIG. 10.

Figure 22:
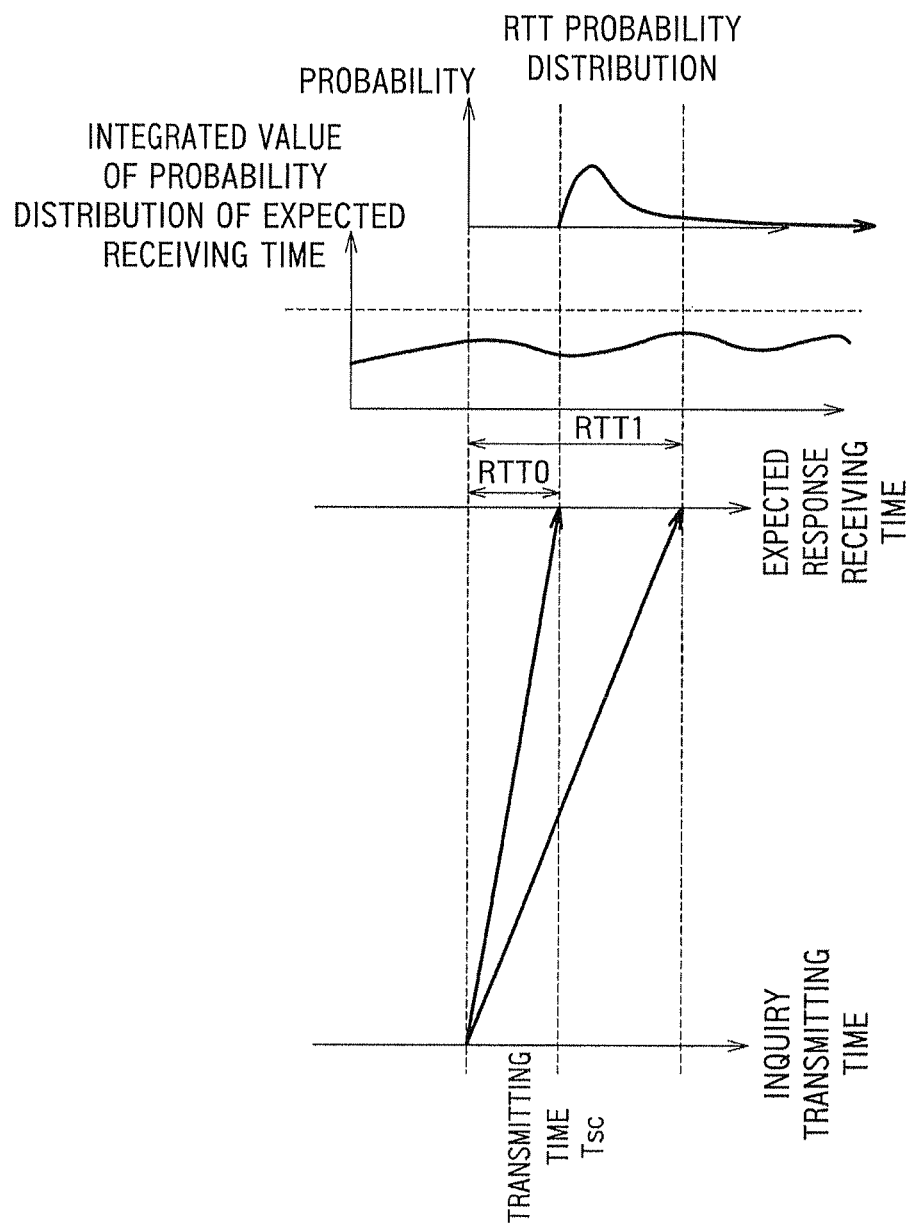
FIG. 22 is a drawing for explaining an example of a method of determining a transmitting time range in the case in which RTT is expressed by a probability distribution of RTT of each point.

Herein, with reference to FIG. 22, an example of a method of determining whether the expected response receiving time is overlapped with the expected response receiving time of the other points or not in the case in which the RTT 602 is expressed by a probability distribution of the RTT of each point will be explained. This is a method in which processing like FIG. 8 and FIG. 9 is carried out while expressing the expression of "the expected receiving time" shown in FIG. 8 and FIG. 9 not by the constant-width time slots, but by a continuous frequency distribution.

Herein, as an example, the expected response receiving time, the probability distribution of the RU, and the transmitting time range are defined in the following manner. Note that "t" is arbitrary time.

Integrated value of the probability distribution of the response receiving time expected for each point: P(t)
RTT probability distribution: R(t)
Transmitting time to be obtained: Tsc Then, value of Tsc is determined so that P'(t) calculated by a following mathematical expression is smoothed as much as possible at any "t" (for example, so as not to exceed a predetermined threshold value).

$$P'(t)=P(t)+R(t+Tsc)$$

As a result, the integrated value of the probability distribution of the expected response receiving time is smoothed, and the probability that the actual response receiving time is overlapped can be therefore reduced. As a matter of course, the probability distribution is not required to be continuous functions. For example, in the case in which the RTT 602 is expressed by the smallest value and the largest value, the method like FIG. 22 may be employed on the presupposition that the RTT probability distribution is uniform in that range.

As described above, according to the present embodiment, the data collection with respect to communication devices having various communication characteristics can be carried out with high quality and high efficiency via a communication environment in which communication delays are varied like a wide-area communication network.

(Modification Version of First Embodiment)

Figure 11:
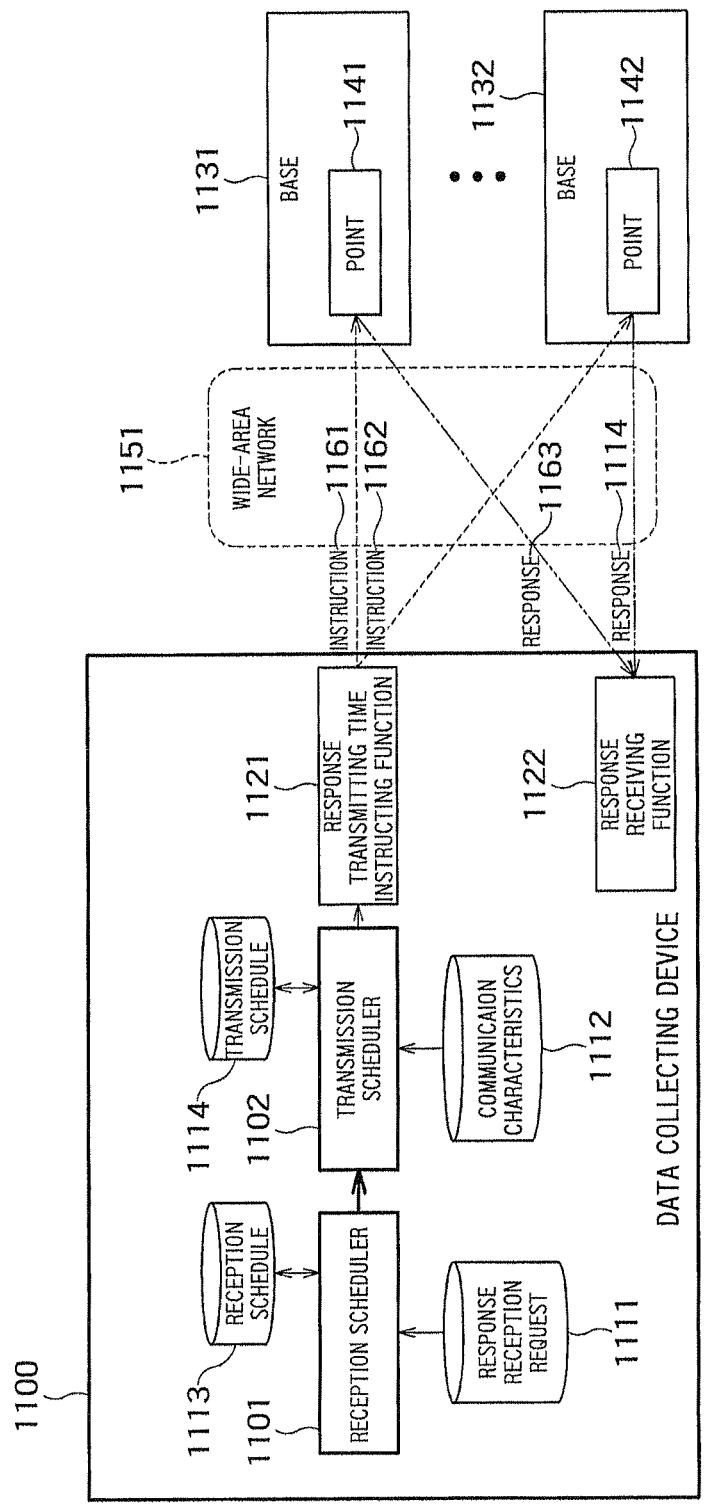
FIG. 11 is a drawing showing a configuration of a data collecting device of a modification version of the first embodiment.

A configuration of a data collecting device 1100 in a modification version of the first embodiment will be explained with reference to FIG. 11. Note that the data collecting device 1100 is a modification version of the data collecting device 100, and a difference in terms of configuration is a response transmitting time instructing function (response transmitting time instructing unit) 1121.

The response transmitting time instructing function 1121 is a function that instructs, from the data collecting device 1100, the time at which each of the points of the bases transmits a response to the data collecting device 1100. For example, a response transmitting time instructing message specifying response transmitting time and a transmitting cycle is transmitted to each of the points of the bases via a wide-area network 1151.

A transmission scheduler 1102 generates a transmission schedule 1114 based on communication characteristics 1112 as shown in FIG. 12. The operation thereof is similar to that explained in FIG. 7 to FIG. 9. Note that a one-way delay 1202 included in the communication characteristics 1112 is the time taken when a response message is transmitted from each of the points of the bases to the data collecting device 1100 and is generally about half of the RTT 602. Therefore, the one-way delay 1202 may be calculated based on the measurement result of the RTT, or the one-way delay may be actually measured. A value obtained by adding the one-way delay 1202 to transmitting time 2202 of the transmission schedule 114 obtained in the manner of FIG. 23 can be used as the response transmitting time.

Figure 13:
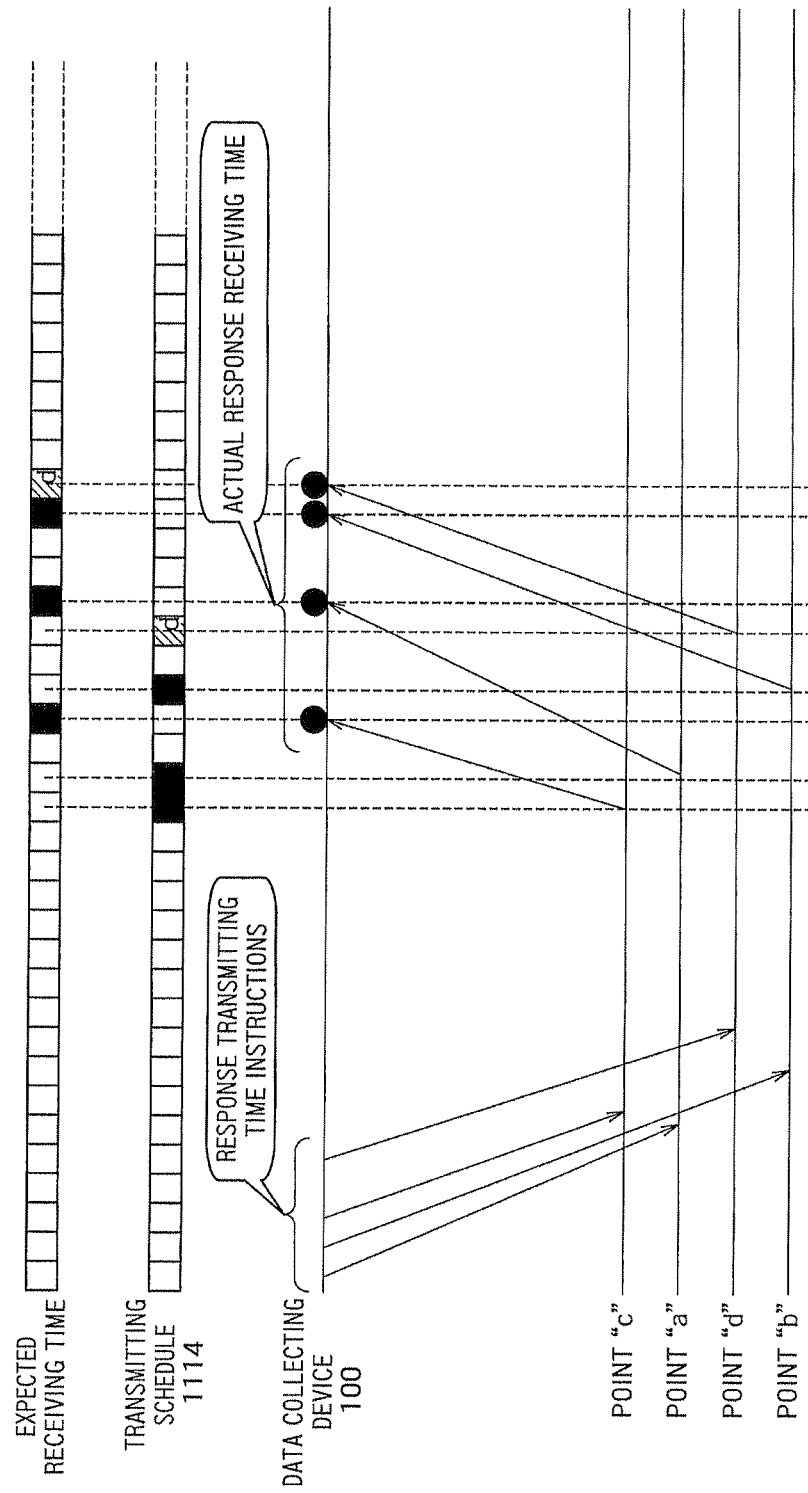
FIG. 13 is a drawing showing an example of a sequence of communication between the data collecting device according to the modification version of the first embodiment and bases.

FIG. 13 shows an example of a sequence of the communication between the above described data collecting device 1100 and the bases. If the time (RTT) taken from transmission of the response transmitting time instructing message including the information of the transmission schedule 1114 from the data collecting device 1100 until reception of a response is equal to the RTT 602 which has been referred to when the transmission scheduler 1102 generated the transmission schedule 1114 of FIG. 23, receiving time is supposed to be prevented from overlapping as shown in FIG. 13.

Herein, the response transmitting time is obtained based on the transmission schedule 1114 and the communication characteristics (one-way delay). However, the response transmitting time of each point of each base may be obtained directly from the reception schedule and the communication characteristics (one-way delay) without generating the transmission schedule. In that case, the point that the response transmitting time is obtained by using the one-way delay is a difference of the present modification version in terms of processing, while, in the first embodiment, the transmitting time of the inquiry message is obtained by using the R17. When only this reference is reflected to the process of the first embodiment, the response transmitting time can be directly obtained directly from the reception schedule and the communication characteristics (one-way delay).

(Second Embodiment)

A configuration of a data collecting system A100 according to the second embodiment will be explained with reference to FIG. 14.

The data collecting system A100 is provided with an inquiry transmitting device A121 and a response receiving device A122 for collecting data from bases such as a base A131 and a base A132 via a wide-area network A151. The inquiry transmitting device A121 transmits an inquiry message A161 and an inquiry message A162 to the bases. The response receiving device A122 receives response messages such as a response message A163 and a response message A164 from the bases.

Figure 14:
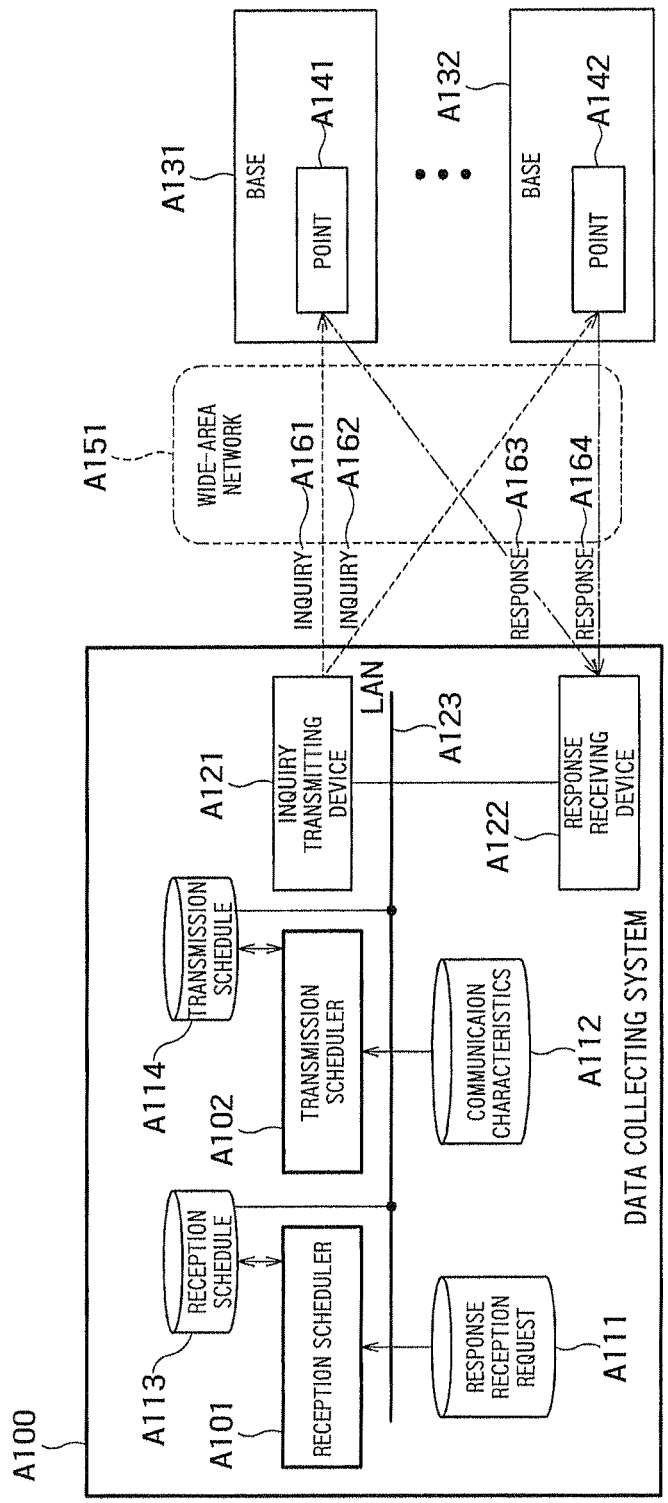
FIG. 14 is a drawing showing a configuration of a data collecting system according to a second embodiment.

A LAN A123 is an arbitrary communication medium for transmitting data by the devices provided in the data collecting system A100 and may be composed as a communication network connecting all of the devices as exemplified in FIG. 14 or may be composed as a plurality of communication networks divided so as to mutually connect the devices which require transmission of data.

Furthermore, the data collecting system A100 is provided with a reception scheduler A101 and a transmission scheduler A102 for determining the time at which the inquiry transmitting device A121 transmits inquiry messages such as inquiry messages.

Herein, the devices provided in the above described data collecting system A100 are capable of obtaining the effects of the present application by various configurations. For example, the devices may be composed as mutually independent arithmetic devices of hardware or may be composed as devices combining a plurality of devices which are part of the devices. As a form of the combined device, for example, the inquiry transmitting device A121 and the response receiving device A122 may be combined to form a communication device having an inquiry transmitting function and a response receiving function.

Note that the operations and obtained effects of the devices provided in the data collecting system A10 in the present embodiment are similar to the operations of the functions provided in the data collecting device 100 of the first embodiment.

(Third Embodiment)

Figure 15:
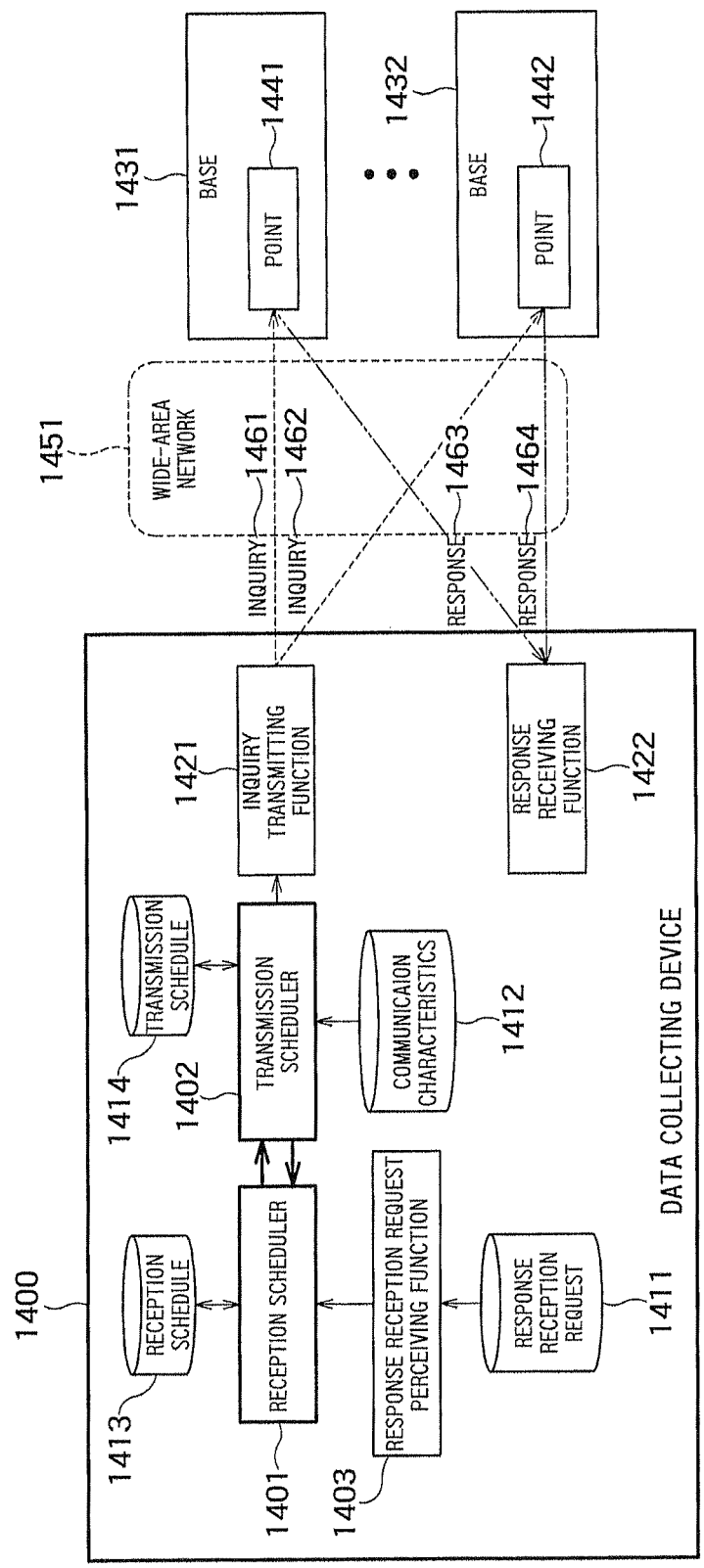
FIG. 15 is a drawing showing a configuration of a data collecting device according to a third embodiment.

A configuration of a data collecting device 1400 according to the third embodiment will be explained with reference to FIG. 15. Note that the data collecting device 1400 is a modification version of the data collecting device 100 of FIG. 1, and a difference in terms of configuration is a response reception request perceiving function (response reception request perceiving unit) 1403.

The response reception request perceiving function 1403 generates information of response reception requests 1411 and monitors changes in the information included in the response reception requests 1411. If the change in the response reception requests 1411 is detected, the reception scheduler 1401 and the transmission scheduler 1402 are operated in order to carry out data collection that satisfies the changed response reception requests 1411.

Examples of the case in which the response reception requests 1411 are changed include: the case in which a request of data collection with respect to a new base is added from the application 201 and the case in which, reversely, a request of data collection with respect to the base for which data collection is not required any more is deleted.

Figure 16:
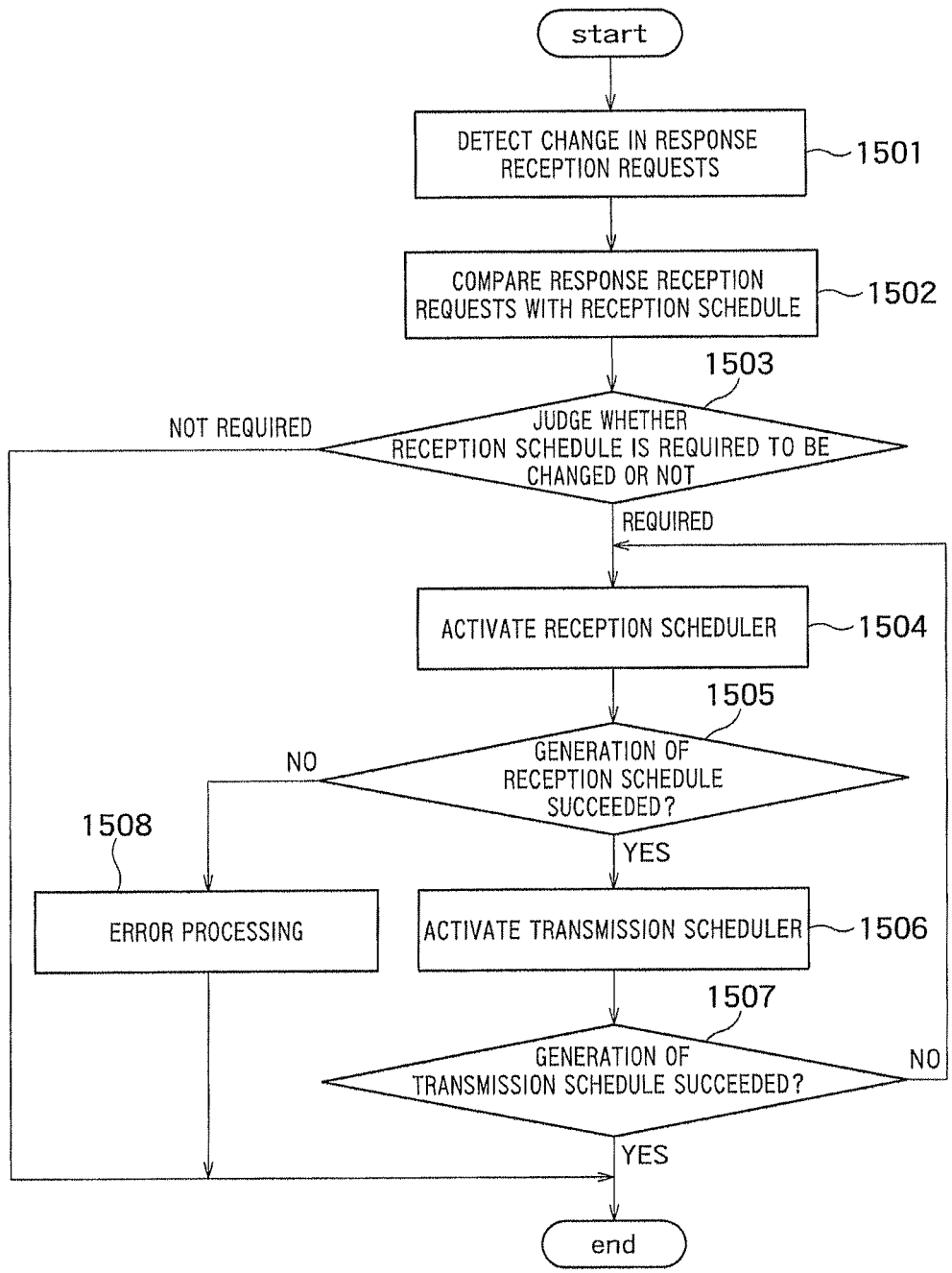
FIG. 16 is a drawing showing an example of an operation of a response reception request perceiving function according to the third embodiment.

An example of an operation of the response reception request perceiving function 1403 will be explained with reference to FIG. 16. If the response reception request perceiving function 1403 detects a change in the information included in the response reception requests 1411 (1501), the response reception requests are compared with the reception schedule 1413 (1502), and whether the reception schedule 1413 satisfies the response reception requests 1411 or not is determined (1503). If satisfied, it is determined that the reception schedule 1413 is not required to be changed ("NOT REQUIRED" in 1503), and no particular operation is required thereafter. Reversely, when not satisfied, it is determined that the reception schedule 1413 is required to be changed ("REQUIRED" in 1503), the reception scheduler 1401 is activated (1504), and a reception schedule 1413 based on the changed response reception requests 1411 is generated.

Whether the reception scheduler 1401 has succeeded in generation of the reception schedule 1413 is determined (1505). If succeeded ("YES" in 1505), the transmission scheduler 1402 is activated (1506) and is caused to generate a transmission schedule 1414. Whether the transmission scheduler 1402 has succeeded in generation of the transmission schedule 1414 or not is determined (1507). If succeeded ("YES" in 1507), the process is terminated. Then, in a manner similar to the first embodiment, inquiry messages can be transmitted to the points of the bases in accordance with the transmission schedule 1414, and response messages from the points of the bases can be received.

Herein, in step 1505, if it is determined that generation of the reception schedule 1413 failed ("NO" in 1505), the reception schedule 1413 that satisfies the response reception requests 1411 cannot be generated; therefore, in this example, an error is determined (1508), and the process is terminated. At this point, the occurrence of the error may be output to outside, or a process of changing the response reception requests 1411 may be carried out to resume the process from step 1502.

In step 1507, if it is determined that generation of the transmission schedule 1414 failed ("NO" in 1507), the transmission schedule 1414 that satisfies the reception schedule 1413 cannot be generated; therefore, in this example the process returns to step 1504 again in order to correct the reception schedule 1413.

Herein, an operation of the data collecting device 1400 in the case in which the information included in the communication characteristics 1412 is the information shown in FIG. 24 will be explained as an example of the case in which generation of the transmission schedule 1414 fails in step 1507. Base identifiers 2303 of FIG. 24 are the information indicating which bases the points represented by identifiers 2301 belong to, and minimum time intervals 2304 refer to minimum time intervals at which the inquiry messages can be transmitted to the bases or points. If this information is provided in the case in which the inquiry messages cannot be received at a high frequency due to a low processing ability of a communication device such as a gateway, which transmits the response of a certain point, adjustment can be carried out so that the frequency of transmitting the inquiry messages by the data collecting device 1400 is suppressed to be low by referencing the minimum time interval.

In the example of FIG. 24, all of the point "a" to the point "d" belong to a base identified as a base A, and a minimum time interval of 4 seconds is set for each of them. Therefore, the inquiry messages to be transmitted to the point "a" to the point "d" have to be transmitted with an interval of at least 4 seconds. However, if the reception schedule 1413 matches that of FIG. 5, all of the receiving time ranges of the point "a" to the point "d" are in 0 to 10 [sec]. Therefore, if the intervals of 4 seconds of the inquiry messages are provided, at least 12 seconds are taken from the transmission time of the point "a" until the transmission time of the point "d", and the reception schedule cannot be satisfied.

Herein, for example, with respect to the reception scheduler 1401, the transmission scheduler 1402 specifies the point "a" to the point "d" as the identifiers to change the contents of the reception schedule 1413 and specifies 0 to 20 [sec] as a candidate of the receiving time range to be changed. Note that the reason why 0 to 20 [sec] are specified is to increase the candidate of the receiving time range to more than 12 seconds since at least 12 seconds are taken from the transmission time of the point "a" until the transmission time of the point "d".

Figure 25:
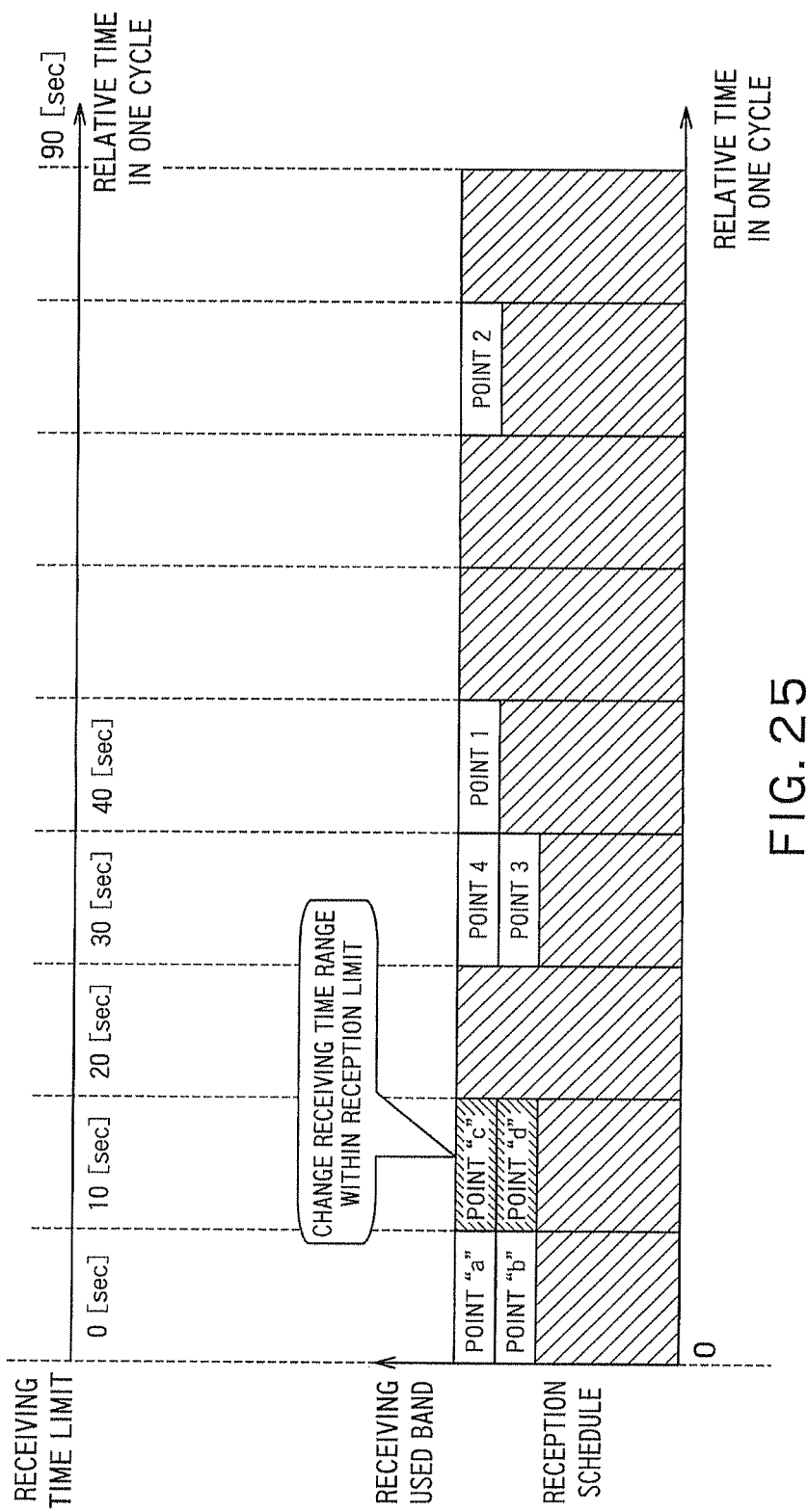
FIG. 25 is a drawing showing an example of a changed reception schedule.

Then, in step 1504, the reception scheduler 1401 can change the reception schedule 1413 to that as exemplified in FIG. 25 based on the identifiers and the candidate of the receiving time range specified by the transmission scheduler 1402 so that the receiving time range of the point "a" to the point "d" is within the range of 0 to 20 [sec].

In the changed reception schedule shown in FIG. 25, the receiving time ranges of the point "a" and the point "b" and those of the point "c" and the point "d" are separated. Therefore, the transmission scheduler 1402 is enabled to generate a transmission schedule that satisfies the communication characteristics 1412 shown in FIG. 24 ("YES" in 1507), and the process can be terminated. Thus, the data collecting device 1400 can execute the data collection in accordance with the changed response reception requests 1411.

(Modification Version of Third Embodiment)

Figure 17:
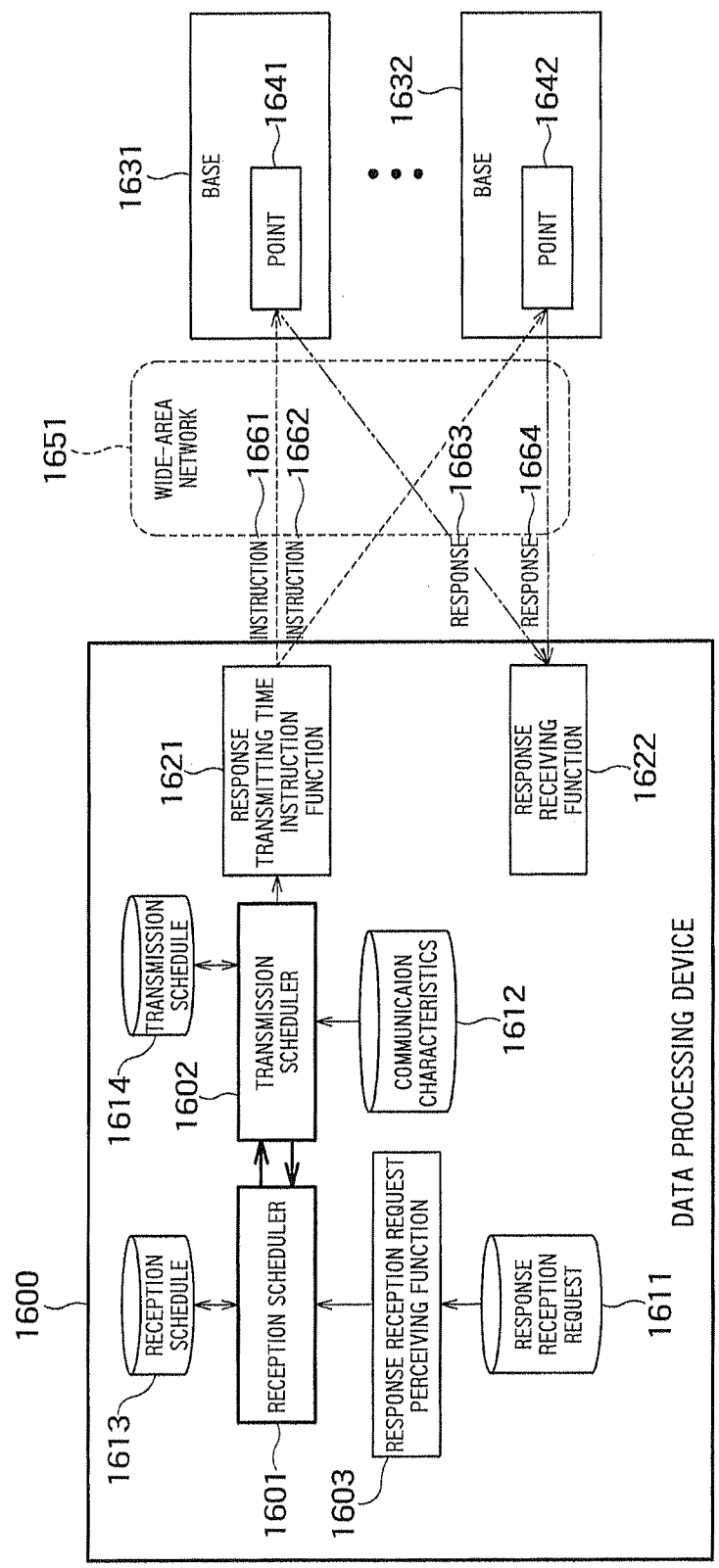
FIG. 17 is a drawing showing a configuration of a data collecting device of a modification version of the third embodiment.

A configuration of a data collecting device 1600 of a modification version of the third embodiment will be explained with reference to FIG. 17. Note that the data collecting device 1600 is a modification version of the data collecting device 1400 of FIG. 15, and a difference in terms of configuration is a response transmitting time instructing function (response transmitting time instructing unit) 1621. Moreover, the response transmitting time instructing function 1621 is equivalent to the response transmitting time instructing function 1211 of FIG. 11 explained in the modification version of the first embodiment. Therefore, the operations and obtained effects thereof are similar to those explained in the modification version of the first embodiment and the third embodiment.

(Fourth Embodiment)

Figure 18:
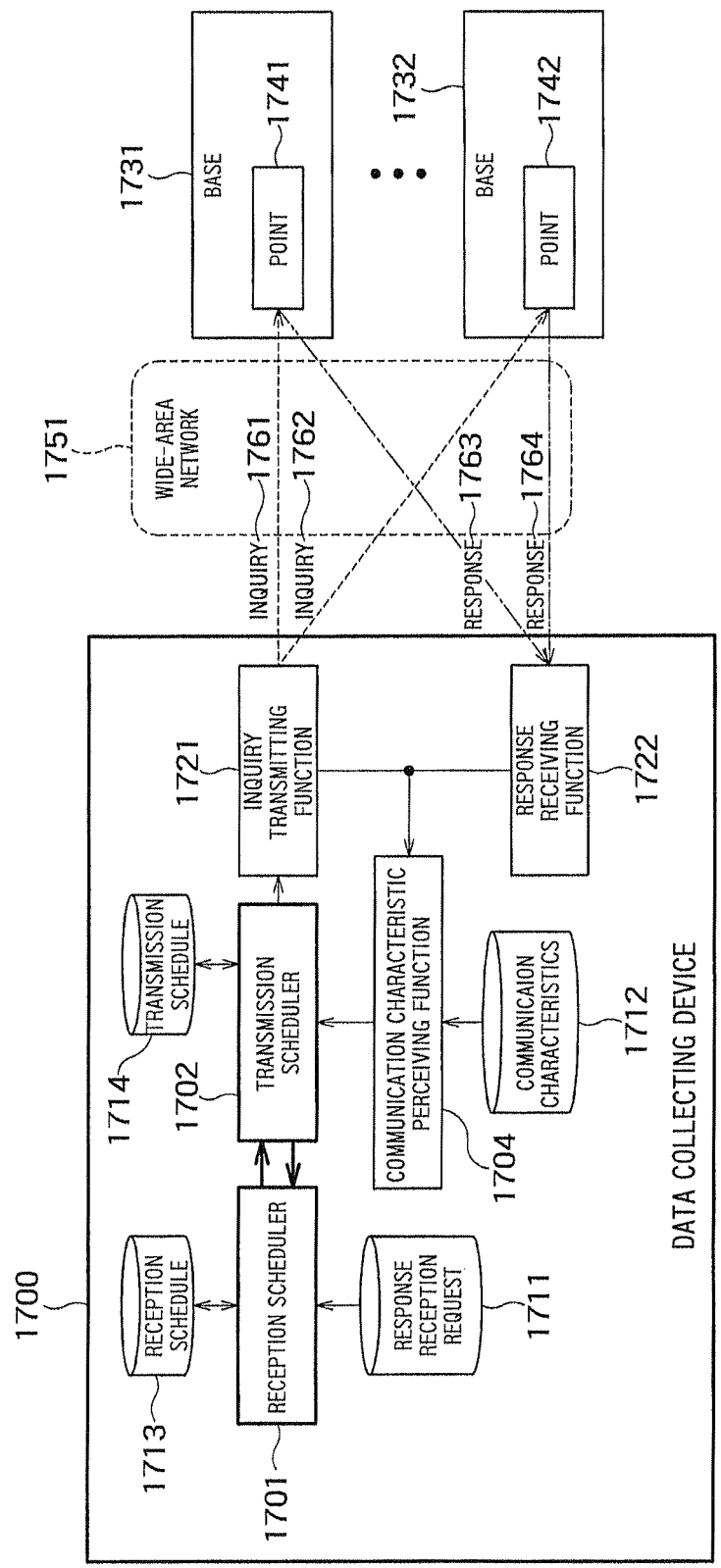
FIG. 18 is a drawing showing a configuration of a data collecting device according to a fourth embodiment.

A configuration of a data collecting device 1700 according to a fourth embodiment will be explained with reference to FIG. 18. Note that the data collecting device 1700 is a modification version of the data collecting device 1400 of FIG. 15, and a difference in terms of configuration is a communication characteristic perceiving function (communication characteristic perceiving unit) 1704.

The communication characteristic perceiving function 1704 obtains records of the time at which communication with the points of the bases is carried out from an inquiry transmitting function 1721 and a response receiving function 1722 and perceives communication characteristics about the bases and the points. The communication characteristic perceiving function 1704 generates communication characteristics 1712 based on the records and detects whether the communication characteristics perceived by the communication characteristic perceiving function 1704 are deviated from the information recorded in the communication characteristics 1712 or not. The "deviation" means that the value of the perceived communication characteristic is changed from the value of the recorded information. Even a little change may be considered as generation of the deviation; alternatively, only when a change (increase/decrease) is made more than a predetermined value, it may be considered as the deviation. Among functions provided by the communication characteristic perceiving function 1704, a function of detecting the presence of the deviation corresponds to a first communication characteristic perceiving function, and a function of perceiving (measuring) the communication characteristics corresponds to a second communication characteristic perceiving function.

The type or format of the information of the communication characteristics obtained by the communication characteristic perceiving function 1704 is arbitrary. For example, only the identifiers of the bases and the points and the message transmitting time or receiving time may be registered; the obtained data may be obtained in a format associated with the information about the obtained data (for example: types, identifiers, attributes of data dependency); the values obtained by measuring RTT by carrying out inquiries and responses a plurality of tomes for each of the bases or points may be obtained; or statistical information of the measured RTT (for example: average, dispersion, median, standard deviation, largest value, smallest value) may be obtained.

Examples of the case in which the deviation is generated include: the case in which communication delays are increased/decreased since communication paths between the data collecting device 1700 and the bases or the points are changed due to update of lines or communication devices in the wide-area network 1751 or influence of maintenance; the case in which communication delays are increased/decreased due to update of communication devices such as gateways which receive inquiry messages in the bases or points and transmit responses; the case in which the frequency by which inquiry messages can be received is increased/decreased; and the case in which communication delays are increased or decreased due to update or maintenance of sensor nodes which observe data of the equipment device in the facilities connected to the communication devices (data of, for example, set temperature of air conditioning and on/off of illumination) or communication networks of controlling systems in the facilities.

Figure 19:
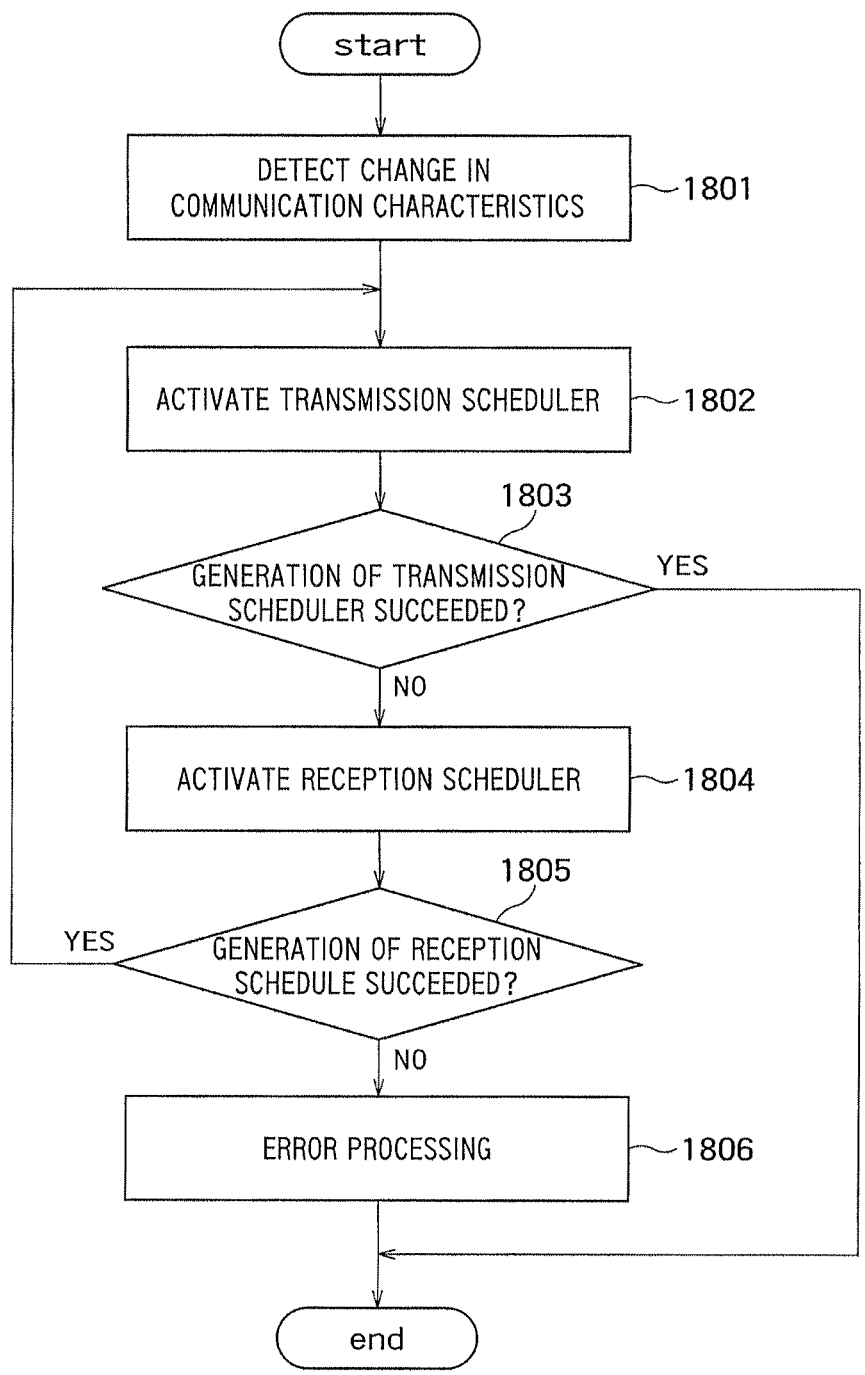
FIG. 19 is a drawing showing an example of an operation of a communication characteristic perceiving function.

An example of an operation of the communication characteristic perceiving function 1704 will be explained with reference to FIG. 19. When the communication characteristic perceiving function 1704 detects a change(s) in the communication characteristics (1801), a transmission scheduler 1702 is activated (1802) in order to generate a transmission schedule 1714 in accordance with the changed communication characteristics. If the transmission scheduler 1702 succeeds in generating the transmission schedule 1714 in accordance with the changed communication characteristics ("YES" in 1803), the process is terminated. This means that the transmission schedule 1714 in accordance with the changed communication characteristics has been generated while satisfying a reception schedule 1713; therefore, the data collecting device 1700 can continue data collection in accordance with the response reception requests 1711.

If it is determined in step 1803 that the transmission scheduler 1702 failed in generation of the transmission schedule 1714 ("NO" in 1803), the transmission schedule 1714 that satisfies the reception schedule 1713 cannot be generated; therefore, in this example, a reception scheduler 1701 is activated (1804) in order to correct the reception schedule 1713.

Herein, an operation of the data collecting device 1700 in the case in which the information included in the changed communication characteristics 1712 is the information shown in FIG. 26 will be explained as an example of the case in which generation of the transmission schedule 1714 fails in step 1803. Base identifiers 2503 of FIG. 26 are the information indicating which bases the points represented by identifiers 2501 belong to, and minimum time intervals 2504 refer to minimum time intervals at which the inquiry messages can be transmitted to the bases or points.

In the example of FIG. 26, all of the point "a" to the point "d" belong to a base identified as a base A, and a minimum time interval of 8 seconds is set for each of them. Therefore, the inquiry messages to be transmitted to the point "a" to the point "d" have to be transmitted with an interval of at least 8 seconds. However, if the reception schedule 1713 matches that of FIG. 5, all of the receiving time ranges of the point "a" to the point "d" are in 0 to 10 [sec]. Therefore, if the intervals of 8 seconds of the inquiry messages are provided, at least 24 seconds are taken from the transmission time of the point "a" until the transmission time of the point "d", and the reception schedule cannot be satisfied.

Herein, for example, with respect to the reception scheduler 1701, the transmission scheduler 1702 specifies the point "a" to the point "d" as the identifiers to change the contents of the reception schedule 1713 and specifies 0 to 30 [sec] as a candidate of the receiving time range to be changed. Note that the reason why 0 to 30 [sec] are specified is to increase the candidate of the receiving time range to more than 24 seconds since at least 24 seconds are taken from the transmission time of the point "a" until the transmission time of the point "d".

Figure 27:
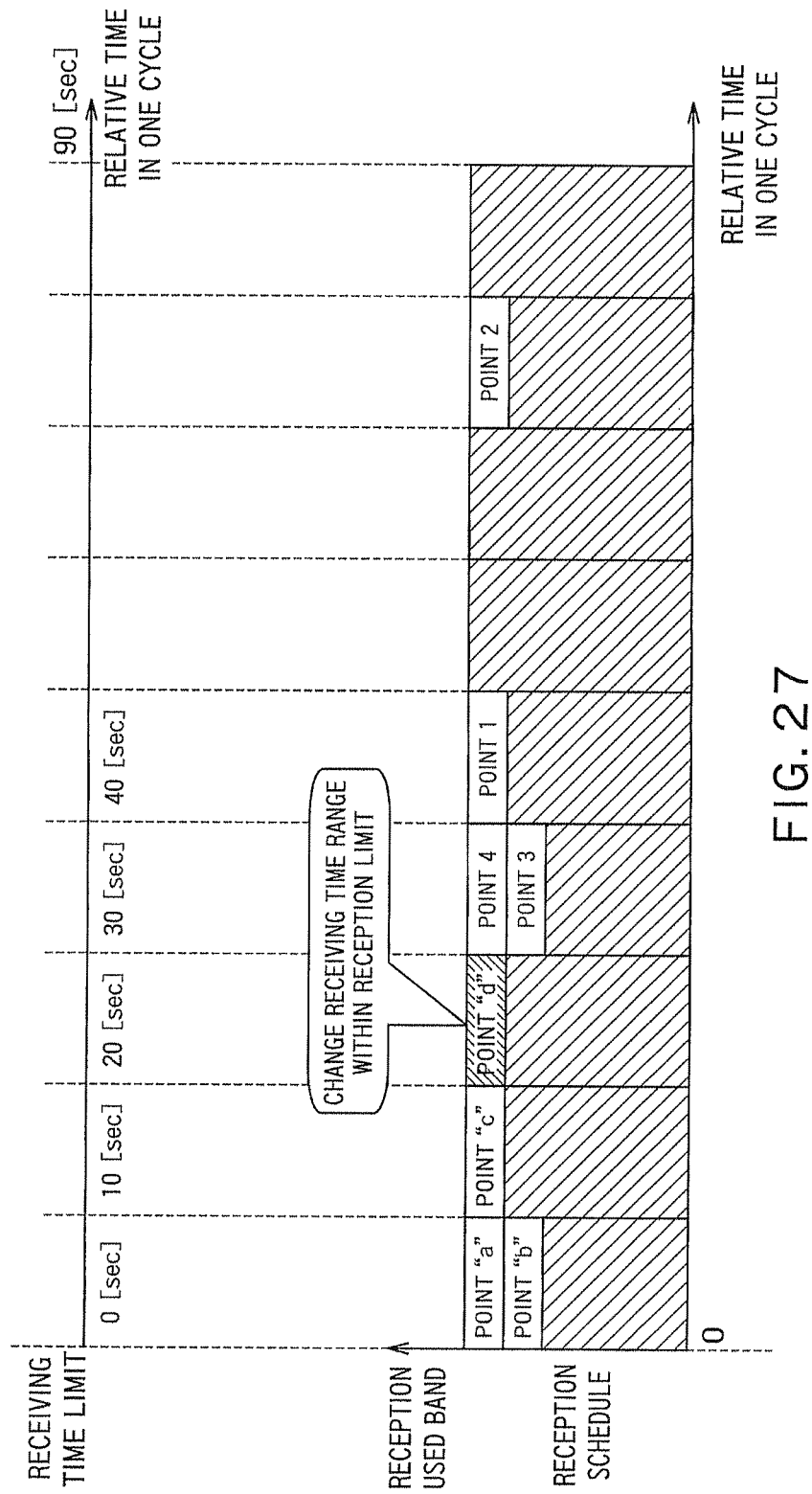
FIG. 27 is a drawing showing an example of a changed reception schedule.

Then, in step 1804, the reception scheduler 1701 can change the reception schedule 1713 to that as exemplified in FIG. 27 based on the identifiers and the candidate of the receiving time range specified by the transmission scheduler 1702 so that the receiving time range of the point "a" to the point "d" is within the range of 0 to 30 [sec].

In the changed reception schedule shown in FIG. 27, the receiving time ranges of the point "a", the point "b", the point "c", and the point "d" are divided. Therefore, the transmission scheduler 1702 is enabled to generate a transmission schedule that satisfies the communication characteristics 1712 shown in FIG. 26 ("YES" in 1805), and the process can be terminated. Thus, the data collecting device 1700 can execute the data collection in accordance with the changed communication characteristics 1712.

In step 1805, if it is determined that generation of the reception schedule 1713 failed ("NO" in 1805), the reception schedule 1713 that satisfies the response reception requests 1711 cannot be generated; therefore, in this example, an error is determined (1806), and the process is terminated. At this point, the occurrence of the error may be output to outside, or a process of changing the response reception requests 1711 may be carried out to resume the process from step 1804.

(Modification Example of Fourth Embodiment)

Figure 20:
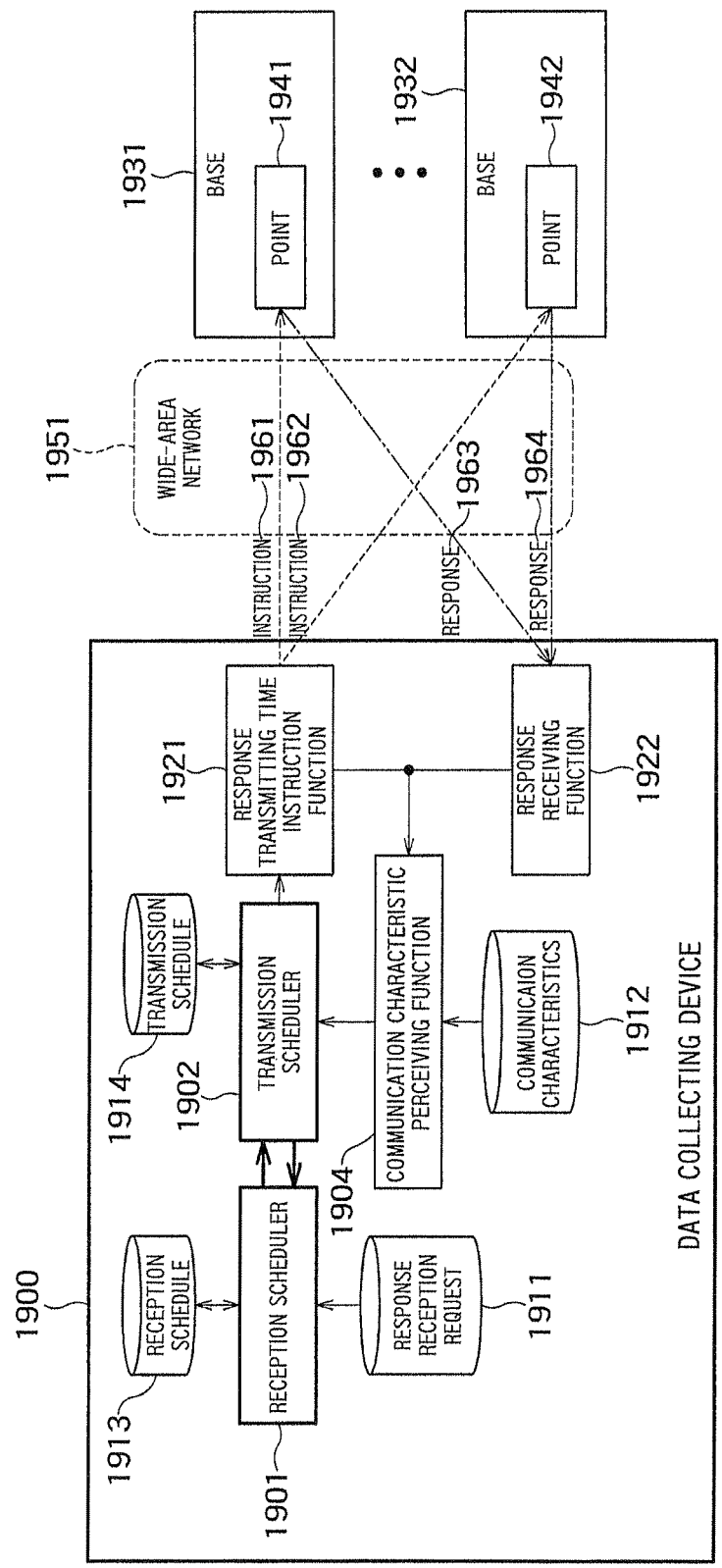
FIG. 20 is a drawing showing a configuration of a data collecting device of a modification version of the fourth embodiment.

A configuration of a data collecting device 1900 of a modification version of the fourth embodiment will be explained with reference to FIG. 20. Note that the data collecting device 1900 is a modification version of the data collecting device 1700 of FIG. 18, and a difference in terms of configuration is a response transmitting time instructing function (response transmitting time instructing unit) 1921. Moreover, the response transmitting time instructing function 1921 is equivalent to the response transmitting time instructing function 1121 of FIG. 11 explained in the modification version of the first embodiment. Therefore, the operations and obtained effects thereof are similar to those explained in the modification version of the first embodiment and the fourth embodiment.

(Matters Common to Above Embodiments)

At least part of the devices explained in the above described embodiments may be composed of hardware or may be composed of software. If composed of the software, a program that realizes at least part of the functions of the devices may be housed in a recording medium such as a flexible disk or a CD-ROM and read and executed by a computer. The recording medium is not limited to a detachable medium such as a magnetic disk or an optical disk, but may be a fixed-type recording medium such as a hard disk device or a memory.

Moreover, the program that realizes at least part of the functions of the devices may be distributed via a communication line (including wireless communication) such as the Internet. Furthermore, the program may be housed in a recording medium or distributed via a wired line or a wireless line such as the Internet in the state in which the program is encrypted, modulated, or compressed.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A data collecting device configured to collect data via a network from a plurality of bases, the bases each including at least one of a sensor and an actuator, the data collected from each base comprising data of the at least one of the sensor and the actuator, the data collecting device comprising:

an inquiry transmitter configured to transmit inquiry messages to the bases, respectively, to request transmission of the data;

a response receiver configured to receive response messages including the data from the bases, respectively;

a reception scheduler configured to generate a reception schedule to receive the response messages from the bases based on request information indicating a collection condition to collect data from the bases, wherein the request information specifies, as the collection condition, at least data receiving cycles to receive the data from the bases and receiving time limits to receive the data from the bases; and a transmission scheduler configured to generate a transmission schedule to transmit the inquiry messages based on the reception schedule and characteristics of communication with the bases; wherein the reception scheduler determines receiving time ranges to receive data from the bases on a basis of the collection condition indicated by the request information such that the receiving time ranges shift from each other in a direction of time and the receiving time limits to receive the data from the bases are included in the receiving time ranges corresponding to the bases, and generates the reception schedule which includes the determined receiving time ranges of the data from the bases, the transmission scheduler determines transmitting times to transmit the inquiry messages to the bases such that the data collected from the bases are received within the receiving time ranges corresponding to the bases and the transmitting times to transmit the inquiry messages to the bases are different from each other, and generates the transmission schedule which includes the determined transmitting times of the inquiry messages to the bases, and the inquiry transmitter transmits the inquiry messages to the bases, respectively, at the transmitting times defined by the transmission schedule.

2. The device according to claim 1, wherein the transmission schedule determines the transmitting times to the bases such that the receiving times to receive the data from the bases are different from each other.

3. The device according to claim 1, further comprising:
a response reception request perceiving unit implemented by a processor and configured to perceive whether contents of the request information have changed; wherein
the reception scheduler re-generates the reception schedule if the contents of the request information are changed; and
the transmission scheduler generates the transmission schedule based on the re-generated reception schedule.

4. The device according to claim 1, further comprising:
a communication characteristic perceiving unit implemented by a processor and configured to perceive whether the characteristics of communication with the bases have changed; wherein
the transmission scheduler re-generates the transmission schedule based on the changed characteristics of the communication if the characteristics of the communication with at least one of the bases are changed.

5. The device according to claim 1, wherein
the transmission scheduler transmits an instruction to change the reception schedule to the reception scheduler if a transmission schedule that satisfies the reception schedule cannot be generated; and
the reception scheduler changes the reception schedule in accordance with the instruction to change the reception schedule.

6. The device according to claim 5, wherein
the instruction to change the reception schedule includes
an identifier of the base for which transmitting time could not be determined among the bases, and
a candidate of a receiving time range to receive the response message from the base.

7. The device according to claim 1, further comprising:
a communication characteristic perceiving unit implemented by a processor and configured to measure response times with the bases and calculate the characteristics of the communication based on the measured response times; wherein
the transmission scheduler uses the characteristics of the communication calculated by the communication characteristic perceiving unit.

8. The device according to claim 7, wherein
the communication characteristic perceiving unit obtains a frequency distribution of the response times with the bases as the characteristics of the communication.

9. The device according to claim 8, wherein
the transmission scheduler determines the transmitting times to transmit the inquiry messages based on the frequency distribution so that a probability of overlapping of the receiving times of the response messages does not exceed a predetermined threshold value.

10. A non-transitory computer readable medium storing a computer program executable by a computer to collect data via a network from a plurality of bases, the bases each including at least one of a sensor and an actuator, the data collected from each base being data concerning the at least one of the sensor and the actuator, the computer program, when executed, causing the computer to perform operations comprising:
transmitting inquiry messages to the bases, respectively, to request transmission of the data;
receiving response messages including the data from the bases, respectively;
generating a reception schedule of the response messages from the bases based on request information indicating a collection condition to collect the data from the bases, wherein the request information specifies, as the collection condition, at least data receiving cycles to receive the data from the bases and receiving time limits to receive the data from the bases; and
generating a transmission schedule of the inquiry messages based on the reception schedule and characteristics of communication with the bases; wherein
the generating of a reception schedule includes determining receiving time ranges to receive data from the bases on a basis of the collection condition indicated by the request information such that the receiving time ranges shift from each other in a direction of time and the receiving time limits to receive the data from the bases are included in the receiving time ranges corresponding to the bases, and generates the reception schedule so as to include the receiving time ranges of the data from the bases,
the generating of a transmission schedule includes determining transmitting times of inquiry messages to the bases such that the data from the bases are received within the receiving time ranges corresponding to the bases and the transmitting times to the bases are different from each other, and generates the transmission schedule so as to include the transmitting times of the inquiry messages to the bases, and
the inquiry messages are transmitted to the bases at the transmitting times defined by the transmission schedule.

11. The medium according to claim 10, wherein
the operations further include determining a transmission time of the data by each of the bases based on the transmission schedule and the characteristics of the communication, and response transmitting time instructing messages which specify the transmission time are transmitted to the bases as the inquiry messages.

12. A data collecting system configured to collect data via a network from a plurality of bases, the bases each including at least one of a sensor and an actuator, the data collected from each base being data of the at least one of the sensor and the actuator, the data collecting system comprising:
- an inquiry transmitter configured to transmit to the bases, respectively, inquiry messages to request transmission of the data;
- a response receiver configured to receive response messages including the data from the bases, respectively;
- a response reception request storage configured to store request information indicating a collection condition to collect the data from the bases, wherein the request information specifies, as the collection condition, at least data receiving cycles to receive the data from the bases and receiving time limits to receive the data from the bases;
- a reception scheduler configured to generate a reception schedule to receive the response messages from the bases based on the request information;
- a communication characteristic storage to store characteristics of communication with the bases; and
- a transmission scheduler configured to generate a transmission schedule to transmit the inquiry messages based on the reception schedule and the characteristics of communication with the bases, wherein
- the reception scheduler determines receiving time ranges to receive data from the bases on a basis of the collection condition indicated by the request information such that the receiving time ranges shift from each other in a direction of time and receiving time limits to receive the data from the bases are included in the receiving time ranges corresponding to the bases, and generates the reception schedule so as to include the determined receiving time ranges of the data from the bases,
- the transmission scheduler determines transmitting times to transmit the inquiry messages to the bases such that the data from the bases are received within the receiving time ranges corresponding to the bases and the transmitting times to transmit the inquiry messages to the bases are different from each other, and generates the transmission schedule so as to include the determined transmitting times of the inquiry messages to the bases, and
- the inquiry transmitter transmits the inquiry messages to the bases, respectively, at the transmitting times defined by the transmission schedule.

13. The data collecting system according to claim 12, wherein
- the inquiry transmitter determines transmission times of the data to be transmitted from the bases based on the transmission schedule and the characteristics of the communication, and transmits response transmitting time instructing messages which represent the transmission times as determined, to the bases as the inquiry messages.

14. A data collecting device configured to collect data via a network from a plurality of bases, the bases each including at least one of a sensor and an actuator, the data collected from each base comprising data of the at least one of the sensor and the actuator, the data collecting device comprising:
- a response time transmitter to transmit to the bases, respectively, response transmitting time instructing messages which specify a transmission time to transmit the data;
- a response receiver configured to receive response messages including the data from the bases, respectively; and
- a reception scheduler configured to generate a reception schedule to receive the response messages from the bases based on request information indicating a collection condition to collect data from the bases, wherein the request information specifies, as the collection condition, at least data receiving cycles to receive the data from the bases and receiving time limits to receive the data from the bases; wherein
- the reception scheduler determines receiving time ranges to receive the data from the bases on a basis of the collection condition indicated by the request information such that the receiving time ranges shift from each other in a direction of time and the receiving time limits to receive the data from the bases are included in the receiving time ranges corresponding to the bases, and generates the reception schedule so as to include the determined receiving time ranges of the data from the bases, and
- the response time transmitter determines transmission times to transmit the data to be transmitted from the bases such that data transmitted from the bases are received within the receiving time ranges corresponding to the bases and the receiving times to receive the data transmitted from the bases are different from each other.

* * * * *